United States Patent
Walline et al.

(10) Patent No.: US 10,841,317 B2
(45) Date of Patent: Nov. 17, 2020

(54) PROCESSING CONTENT SHARING SYSTEM DATA FROM A PLURALITY OF REMOTELY CONNECTED COMPUTING DEVICES IN PHYSICAL OR VIRTUALIZED SPACE

(71) Applicant: Dell Products, LP, Round Rock, TX (US)

(72) Inventors: Erin K. Walline, Pflugerville, TX (US); Liam B. Quinn, Austin, TX (US); Sean P. O'Neal, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/674,999

(22) Filed: Mar. 31, 2015

(65) Prior Publication Data
US 2016/0294839 A1 Oct. 6, 2016

(51) Int. Cl.
  *G06F 7/04* (2006.01)
  *H04L 29/06* (2006.01)
  *G06F 16/23* (2019.01)
  *G06F 16/28* (2019.01)
  *G06F 3/0481* (2013.01)
  *H04W 12/08* (2009.01)

(52) U.S. Cl.
  CPC .......... *H04L 63/105* (2013.01); *G06F 3/0481* (2013.01); *G06F 16/23* (2019.01); *G06F 16/285* (2019.01); *H04W 12/0808* (2019.01)

(58) Field of Classification Search
  CPC ................ G06F 21/10; G06F 11/3006; G06F 17/30194; H04L 63/08; H04L 63/102
  See application file for complete search history.

(56) References Cited

U.S. PATENT DOCUMENTS

| | | | | |
|---|---|---|---|---|
| 9,307,042 B2* | 4/2016 | Wu | ...................... | H04L 67/2823 |
| 2006/0161635 A1* | 7/2006 | Lamkin | ............. | G06F 17/30041 709/217 |
| 2012/0010995 A1* | 1/2012 | Skirpa | ................... | G06F 3/0481 705/14.49 |
| 2012/0124613 A1* | 5/2012 | Reddy | .............. | H04N 21/42202 725/27 |
| 2014/0096179 A1* | 4/2014 | Ben-Shalom | ....... | H04L 63/0869 726/1 |
| 2014/0181285 A1* | 6/2014 | Stevens | ................. | H04L 67/322 709/223 |
| 2014/0181513 A1* | 6/2014 | Marek | ................... | H04L 63/062 713/168 |
| 2014/0310414 A1* | 10/2014 | Reeves | ................. | G06F 3/1454 709/225 |

* cited by examiner

*Primary Examiner* — Shewaye Gelagay
*Assistant Examiner* — Carlton Johnson
(74) *Attorney, Agent, or Firm* — Prol Intellectual Property Law, PLLC; H. Kenneth Prol

(57) ABSTRACT

An information handling system includes a processor that executes instructions for a content sharing system that has mixed operating system capabilities. The processor detects pre-paired wireless connectivity for at least one of a plurality of remotely connected computing devices and implements a role-based policy to partially limit content sharing system operation, the operation is based on a role classification. The processor also auto-initiates navigation accessibility within authorized remotely connected computing devices via the content sharing system.

20 Claims, 12 Drawing Sheets

PROCESSING CONTENT SHARING SYSTEM DATA FROM A PLURALITY OF REMOTELY CONNECTED COMPUTING DEVICES IN PHYSICAL OR VIRTUALIZED SPACE

FIELD OF THE DISCLOSURE

The present disclosure generally relates to information handling systems, and more particularly relates to a thin computing system having mixed OS capabilities for execution of a content sharing system locally or via partial remote virtual computing and memory resources.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. In some instances, users may operate via multiple computing devices. In other instances, multiple users on multiple computing devices may want to collaborate and share data. Coordination of a wide variety of content from a variety of devices that may have disparate hardware requirements, software architecture, or distinct operating systems (OS) may be challenging.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
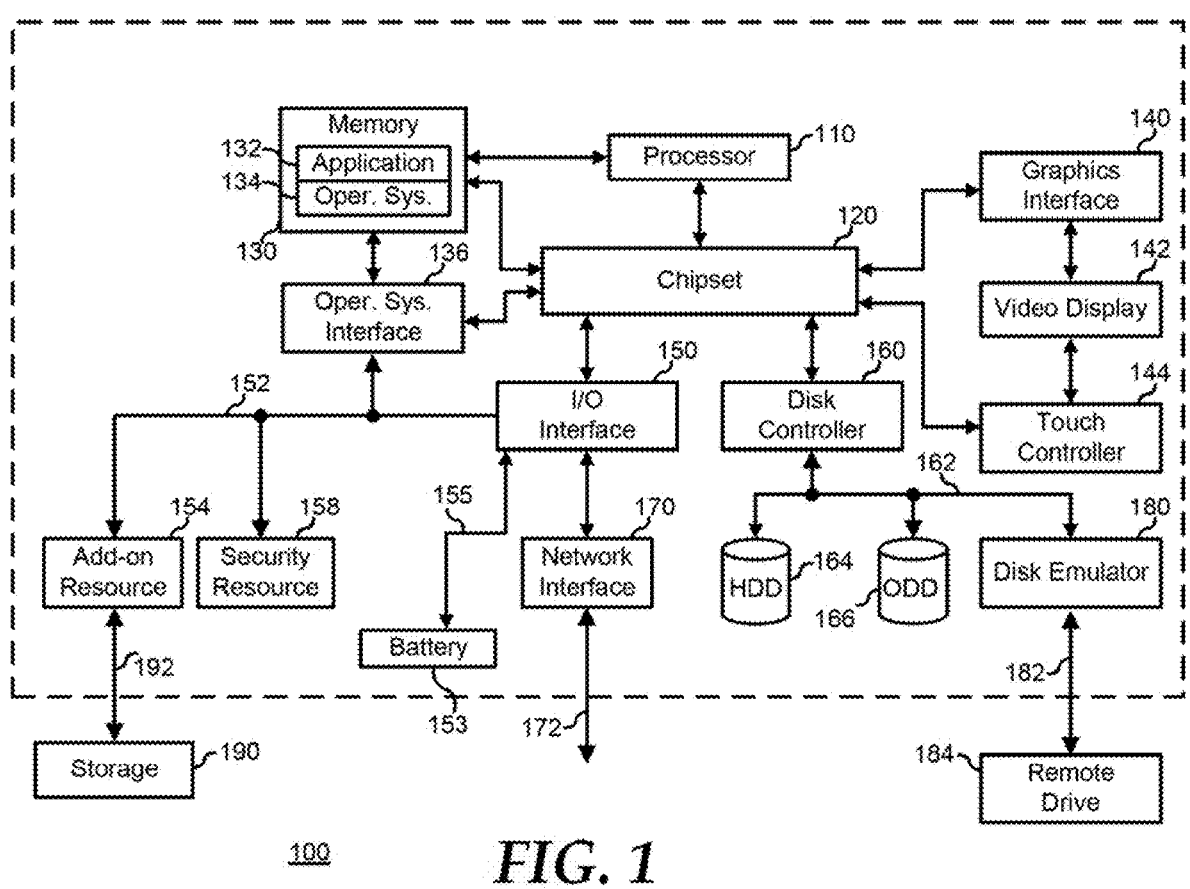
FIG. 1 is a block diagram illustrating an information handling system according to an embodiment of the present disclosure.

FIG. 1 illustrates a generalized embodiment of information handling system 100 for use with the present disclosures in multiple capacities. For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via a processor interface. Processor 110 is connected to memory 130 via a memory bus. Memory 130 is also connected to chipset 120 via the same or another memory bus. Graphics interface 140 is connected to chipset 110 and provides a video display output to a video display 142. Video display 142 is also connected to touch controller 144 and may be connected to chipset 120 via touch controller interface. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130.

Additionally, information handling system 100 may execute instructions for operating system conversion protocols via a processor 110 or chipset 120 to enable files from multiple remotely connected computing devices having a disparity of hardware, software architecture, and operating system types to be interpreted and successfully operated with by operating system 134. For example, information handling system 100 may run Linux kernel drivers with modules for a variety of OS systems and related file systems such as MS Windows, Apple OS, Android and similar operating systems for connectable computing devices including phones, tablet computers, laptops, gaming systems, fitness devices, smart watches, wearable computing devices, home or office environmental computing systems and the like as would be understood by those of skill in the art. These kernel drivers for the OS system of the host 134 for the content sharing system of the present disclosures are available to communicate and interpret alternate OS systems and file structures in remotely connected computing devices to the content sharing system. For a variety of OS systems, conversion of certain file types may also be needed for aggregation or file transfer functions of the content sharing system of the present disclosures example embodiments. In other embodiments, information handling system 100 may communicate, interpret, or execute content files from a variety of source computing devices via conversion to a common file type as is understood by those of ordinary skill in the art which may be utilized in functions of aggregation and file transfer exchanges done via the content sharing system of several embodiments in the present disclosure. In an example, a common file type may be conversion to IP protocol such as FTP.

Graphics interface 140, disk controller 160, I/O interface 150, and touch controller 144 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 is connected to chipset 120. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

In yet other embodiments, disk emulator 180 may work in connection with a remote desktop protocol or similar memory virtualization protocol to operate a remote virtual storage device as if it were a device internal to computing system 100. In such a case, an external interface may be connected form disk emulator 180 via a portion of network interface 170. Connection may be to network connected storage via a wireless or wired network connection, for example, a WPAN/WLAN or other network connection.

I/O interface 150 is connected to chipset 120. I/O interface 150 includes a peripheral interface 152 that connects the I/O interface to an add-on resource 154, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150. Network interface device 170 includes network channel 172 that provides an interface to devices that are external to information handling system 100. In a particular embodiment, one or more network channels 172 are of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof suitable for establishing WPAN, WLAN, WAN or other network connections. Network interface 170 may be a wireless interface or a wired interface in various embodiments. Network channels 172 can be connected to external network resources (not illustrated). The network resource can include another information handling system, a data storage system, another network, a grid management system, another suitable resource, or a combination thereof.

Figure 2:
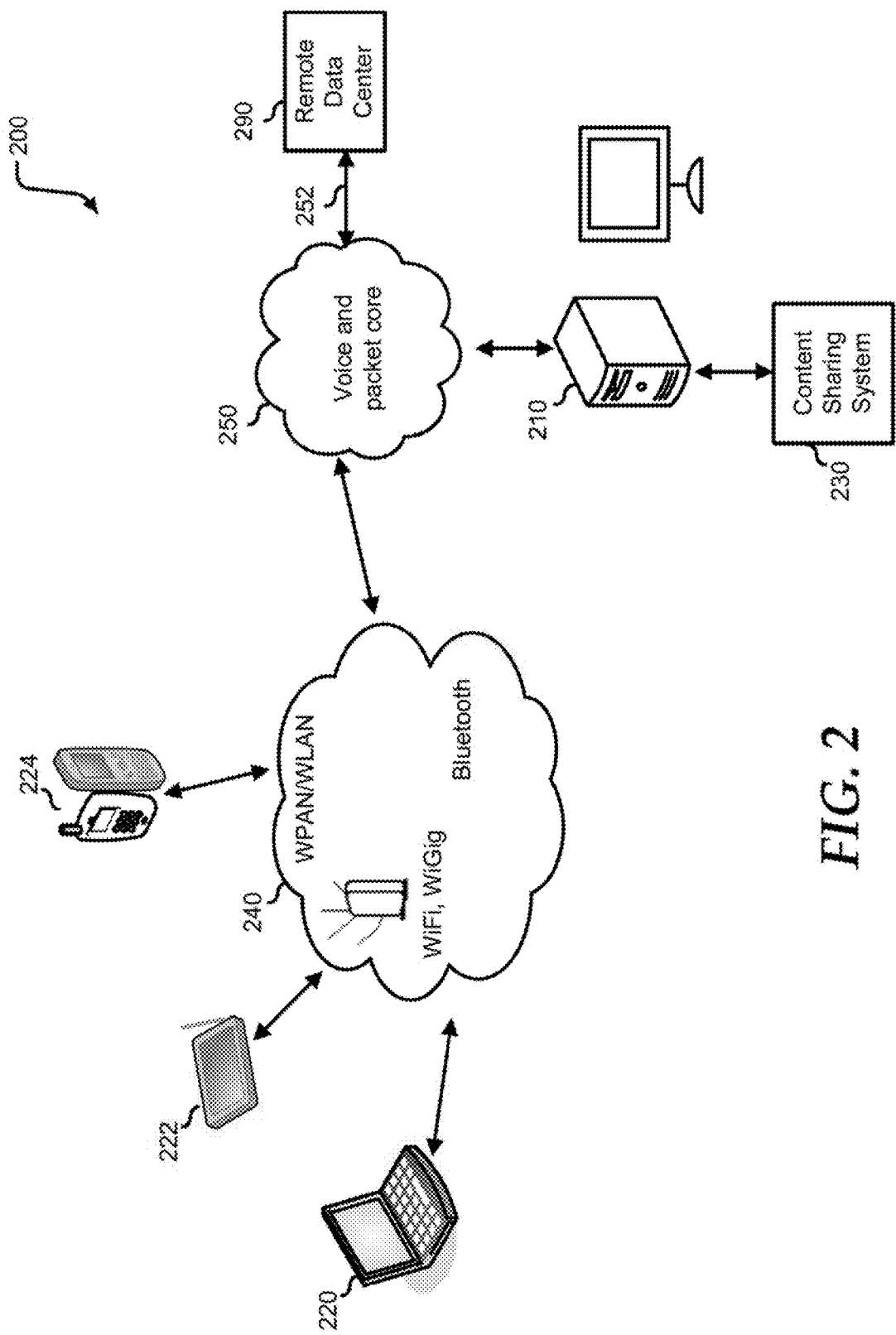
FIG. 2 is a block diagram illustrating a networked information handling system having some or all of a content sharing system, and a plurality of remotely connected computing devices according to an embodiment of the present disclosure.

FIG. 2 illustrates a generalized network 200 that can include one or more information handling systems. In a particular embodiment, network 200 includes networked mobile information handling systems 220, 222, and 224, wireless network access points, and multiple wireless connection link options. Systems 220, 222, and 224 represent a variety of computing resources of network 200 including client mobile information handling systems. Additional resources may be available within network 240 including data processing servers, network storage devices, local and wide area networks, or other resources as needed or desired. As specifically depicted, systems 220, 222, and 224 may be a laptop computer, tablet computer, or smartphone device. These user mobile information handling systems 220, 222, and 224, may access network 240. The user mobile information handling systems 220, 222, and 224 may also access a wider network via a macro-cellular network 250. Further resources may be available including additional data processing servers such as information handling system 210, remote data centers 290, additional network storage devices, additional local and wide area networks, or other resources as needed or desired. For example, network 240 may be a wireless local area network (WLAN), a wireless personal area network (WPAN), or a wireless wide area network (WWAN). Since WPAN or WiFi Direct Connection and WWAN networks can functionally operate similar to WPAN/WLANs, they may be considered as wireless local area networks (WPAN/WLANs) for purposes herein. Wireless communications across wireless local area network 240 may be via standard protocols such as IEEE 802.15.1 Bluetooth SIG, IEEE 802.11 Wi-Fi, IEEE 802.11 ad WiGig, IEEE 802.15 WPAN or similar wireless network protocols. Alternatively, other available wireless links within network 200 may include macro-cellular connections via one or more protocols including 2G standards such as GSM, 2.5G standards such as GSM EDGE and GPRS, 3G standards such as W-CDMA/UMTS and CDMA 2000, or 4G standards such as WiMAX, LTE, and LTE Advanced. Mobile information handling systems 220, 222, and 224 may connect to the external network via base station locations at service providers. Links to WPAN/WLAN 240 may be via these macro-cellular connections as well or via other connections as is understood.

In other aspects, components of a WPAN/WLAN 240 may be connected by wireline or Ethernet connections (not shown) to the wider external network 250 with access to additional resources as described above including additional information handling systems 210 for remote processing or remote data centers 290. For example, wireless network access points may be connected to a wireless network controller and an Ethernet switch. Connection between the wireless network 240 and a wider network 250 including information handling system 210 and remote data center 290 may be via Ethernet or another similar connection to the world-wide-web, a WAN, a LAN, another WPAN/WLAN, or other network structure. Additional resources such as information handling system 210 and remote data center 290 may host some or all of a content sharing system such as described in the present disclosure. In other aspects, a host information handling system 210 and/or remote data center 290 may connect to WPAN/WLAN 240 in other embodiments. Such a connection via WPAN/WLAN access point/ Ethernet switch or via macrocellular connections to the external network may be a backhaul connection. The access point may be connected to one or more wireless access points in the WPAN/WLAN before connecting directly to a mobile information handling system or may connect directly to one or more mobile information handling systems 220, 222, and 224.

The voice and packet core network 250 may access externally accessible computing resources such as information handling system 210 and connect to remote data centers 290 as described. The voice and packet core network 250 may contain multiple intermediate web servers or other locations with accessible data (not shown). Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 222, and 224 allowing streamlining and efficiency within those devices. Similarly, remote data center 290 permits fewer resources to be maintained in other parts of network 200 such as at networked information handling system 210.

In an example embodiment, the cloud or remote data center 290 may run hosted applications for systems 220, 222, and 224 or for other networked systems such as information handling system 210. This may occur by establishing a virtual machine application executing software to manage applications hosted at the remote data center 290. Mobile information handling systems 220, 222, and 224 or information handling system 210 may be adapted to run one or more applications locally, and to have hosted applications run in association with the local applications at remote data center 290. The virtual machine application may serve one or more applications to each of user mobile information handling systems 220, 222, and 224 and information handling system 210. Thus, as illustrated, systems 210, 220, 222, and 224 may be running applications locally while requesting data objects related to those applications from the remote data center 290 via wireless network.

For example, a content sharing system application may run locally at system 210. The content sharing system application may be associated with a host application that represents a content sharing system server. In another example, a data storage client application such as Microsoft Sharepoint may run on system 210. It may be associated with a host application running at remote data center 290 that represents a Sharepoint data storage server. In a further example, a web browser application may be operating at system 210. The web browser application may request web data from a host application that represents a hosted website and associated applications running at remote data center 290. Similarly, local applications may be run on remotely connected information handling systems 220, 222, and 224 and associated with a host application on information handling system 210 or remote data center 290 or some combination.

To communicate within the network 200, the systems 220, 222, and 224 each have a wireless interface module or wireless adapter, hereinafter referred to as a wireless adapter. The wireless adapters are operable to each provide a wireless radio frequency interface to transmit and receive voice and data between the respective systems 220, 222, and 224 and one or more external networks via wireless network 240, 250, or a wireline connection.

The wireless adapters can represent add-in cards, wireless network interface modules that are integrated with a main board of respective systems 220, 222, and 224 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for Wifi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

The wireless adapters may be capable of connecting via a WPAN/WLAN 240 or a macro-cellular network (WWAN) via a variety of the wireless standards or via wireline as described above. Each of the wireless adapters for client mobile information handling systems 220, 222, and 224 are uniquely identified on network 200 via one or more unique identifiers permitting authentication and access. For example, the wireless device can each be identified by one or more Subscriber Identity Modules (SIM), one or more of a media access control (MAC) address, an Internet protocol (IP) address, a worldwide name (WWN), Bluetooth UUID, or another unique identifier as needed or desired. Additional examples may assign a user name and password as a unique identifier in some example embodiments. Association of a user and a wireless interface module of a user information handling system may be made via communications across a networking control plane. For example, a user information handling system may be associated with a user via communication with a database such as Home Subscriber Server (HSS), Active Directory or similar database.

The wireless adapters may operate in accordance with any wireless data communication standards. To communicate with wireless local area network 140, standards including Bluetooth SIG, IEEE 802.11 WLAN standards, IEEE 802.15 WPAN standards, WWAN such as 3GPP or 3GPP2, or similar wireless standards may be used. The WPAN/WLAN network 240 may provide connectivity via Bluetooth, WiFi, or WiGig for example. The wireless network 240 may have a wireless mesh architecture in accordance with mesh networks described by the above wireless data communications standards or similar standards. Wireless links may also connect to the external network via a WPAN, WLAN, or similar wireless switched Ethernet connection. The wireless data communication standards set forth protocols for communications and routing via access point, as well as protocols for a variety of other operations. Other operations may include handoff of client devices moving between nodes, self-organizing of routing operations, or self-healing architectures in case of interruption.

An information handling system 210 networked with a plurality of information handling systems 220, 222, and 224 as illustrated in network 200 may operate a content sharing system 230 according to various embodiments. The content sharing system 230 may be series of executable code instructions operating on a processor in information handling system 210. In other embodiments, content sharing system 230 may be code executable via a processing system on one or more a mobile information handling systems such as 220, 222, and 224 or may be remotely operated via remote data center 290. Content sharing system 230 in other embodiments may be all or partly hard coded into an application specific processing system or may be distributed among several different information handling systems for processing and execution. Information handling system 210 and content sharing system 230 may be connected via macrocellular network, a wireline connection, a wider voice and packet core network 250 or may be directly connected to WPAN or WLAN network 240 or any combination of the same. As described above, content sharing system 230 may have mixed operating system capabilities in that plug-ins or other processor commands may run via an content sharing system operating system allowing interfacing by the content sharing system 230 with remotely connected information handling systems 220, 222, and 224 as discussed further below. Information handling system 230 may be connected to display 242 for displaying a content sharing system desktop for interfacing, communication and executing commands to remotely connected information handling systems such as 220, 222, and 224.

Content sharing system 230 permits normalization of communication, functions, and sharing of files and data among information handling systems 220, 222, and 224 via a central information handling system 230. Files on information handling systems 220, 222, and 224 may be accessed, navigated and aggregated at a remote data center 290 or in remote storage by the content sharing system 230. Operating system conversion for data types and for commands permits control and navigation of remotely connected information handling systems 220, 222, and 224 from the content sharing system 230 despite differing hardware, system architectures, disparate operating systems and the like. Each remotely connected information handling system such as example systems 220, 222, and 224 may be represented on display screen 242 in the content sharing system desktop with a device environment-representative window. The device environment-representative window corresponding to each remotely connected information handling system such as 220, 222, and 224 may be used in embodiments to assist with communication with the remotely connected information handling system 220, 222, and 224. Additionally, device environment-representative windows may be used for navigation and control of applications and files with each corresponding respective remotely connected information handling systems 220, 222, and 224. By use of such a content sharing system 230 for communication, control, and operation of remotely connected information handling systems 220, 222, and 224, collaboration among the connected computing devices and aggregation of files dispersed among the computing devices may be achieved in a more seamless and efficient manner on one content sharing desktop. Information handling system 210 may operate as a thin shell OS client with addition computing and storage for conversion among operating systems and architectures managed remotely via a remote data center with a plurality of servers such as shown at 290.

In various embodiments discussed in additional detail below, computing device environment-representative windows may display application and data file trees showing architecture of files and executable code located on remotely connected information handling systems 220, 222, and 224. In yet other embodiments, images of local desktops including icons and control soft keys and other features may be replicated in the device environment-representative windows of the content sharing system 230 for one or more information handling systems 220, 222, and 224 where such a replication is possible or applicable. In some instances, remotely connected information handling systems 220, 222, and 224 may not have any substantial desktop or navigation system. For example, this may be the case for wearable technology such as a fitness computers, home control systems, or other information handling systems that may be remotely connected. In yet other circumstances, desktop images or icons of remotely connected information handling systems 220, 222, and 224 may be proprietary or unwieldy to replicate in computing device environment-representative windows and a file tree or other similar structure may be used instead.

More seamless control amongst varying remotely connected information handling systems 220, 222, and 224 may happen in execution of commands, communications, or navigation of system applications and data in each information handling systems 220, 222, and 224 via the content sharing system 230. For example, in some embodiments, files may be transferred among remotely connected information handling systems 220, 222, and 224 with simple drag-and-drop or shortcut key functionality by collection of the file or data from a transferor computing device to the content sharing system 230 and stored locally in storage at information handling system 210 or stored remotely at a remote data center 290. The content sharing system 230 may convert the file or data to an architecture or format useable by the content sharing system 230 or may convert the file or data to a format for the transferee system as necessary. In certain embodiments, the content sharing system desktop will indicate by visual cues that a file transfer has taken place or is taking place. Change in color or highlighting of a file may indicate the change in file status for example. Additional visual cues will indicate which environment is being used when interfacing with the content sharing system desktop via display 242 or via a remotely connected information handling system 220, 222, or 224 in some embodiments.

In other aspects, the content sharing system 230 may aggregate files and data from a plurality of remotely connected information handling systems 220, 222, and 224. Data and files aggregated from a plurality of remotely connected information handling systems such 220, 222, and 224 may come from a variety of system hardware types, system architectures, or disparate operating systems and file or data formats. The content sharing system 230 may interface with the remotely connected information handling systems such as 220, 222, and 224. Upon obtaining access, navigation of some or all files on information handling systems 220, 222, and 224 will allow aggregation of permitted files to one shared drive associated with the content sharing system 230. This may be a shared local drive at information handling system 210, may be a shared virtual drive such as at remote data center 290, or may be any combination. The content sharing system 230 may use systems to organize aggregated data from the plurality of remotely connected information handling systems. In this way, navigation of a complete set of data or files from the plurality of remotely connected information handling systems such as 220, 222, and 224 is more seamless and efficient.

Additionally, the content sharing system 230 may organize aggregated files from a plurality of remotely connected information handling systems such as 220, 222, and 224 in a variety of ways. For example, files and data may be organized by OS type from which the file or data was retrieved, or by computing device from which the data or files were retrieved. In other examples, geotags or other location metadata may be used to organize files and data aggregated from a plurality of remotely connected information handling systems such as 220, 222, and 224 by geographic region or location. For example, image, video, or audio data and files may be organized from the plurality of remotely connected information handling systems such as 220, 222, and 224 by location where the files were recorded. Similarly, aggregated data may be organized by chronology in another example of this aspect of the content sharing system 230.

In yet other examples, data may be organized according to how files and content are related to categories selected by the user or created by the user via the content sharing system 230. For example, categories that are designated personal, work-related, kid-related, or related other activity related may be used to organize aggregated files in shared storage by the content sharing system 230. Categorization criteria may be varied in embodiments of the content sharing system aggregation aspect as is understood by those of skill in the art. Categories by file relatedness to usage categories may assess factors such as where data or files come from, the type of files, identifying metadata for times, locations and other aspects of a file, or identifying content of the files. For example, a work based remotely connected information handling system may contain files that are mixed work, personal, kids, and other activities. The source being a work computing device may weigh heavily towards a work categorization, however a geotag or time stamp may indicate that a file was created at a place or time not typically associated with work. A file type may also play a factor in determining a categorization. For example a spreadsheet, word processing document or other file type may be more typically associated with a user's work than a video or photographic image. This would depend on designations of the user or a learned trend of factors when categorizing relatedness to usage of aggregated files. Accordingly, the content sharing system 230 may be able to further access the content of the files or data from remotely connected information handling systems such as 220, 222, and 224 to determine additional context for file categorization. For example, image or face recognition may be used to identify individuals in files. Scans of documents may identify names of an employer, a family member, an organization name, project names, descriptions, titles, keywords or other information for classification purposes. In a shared memory environment, aggregated data from a plurality of remotely connected information handling systems such as 220, 222, and 224 may then be reviewed and managed according to relatedness categorization. Additionally, operations may be performed on the aggregated files from the content sharing system location via remote desktop protocol or similar virtualization techniques. In other embodiments, operations, navigation of files including aggregated files may also be managed by a user from one of the remotely connected information handling systems such as 220, 222, and 224. In other words, access to or control of the content sharing system 230 under certain embodiments may be granted to one or more remotely connected information handling systems such as 220, 222, and 224 via a similar virtualization protocol.

In one aspect of the present disclosure, automatic access by the content sharing system may be requested or granted upon detection of remote connection by a remotely connected information handling systems such as 220, 222, and 224 connecting to a network 240 monitored by content sharing system 230. For example, the content sharing system 230 may poll a monitored network, such as a wireless network 240 to monitor the network for remotely connected or connecting information handling systems 220, 222, and 224 available for pairing with the wireless network and for pairing with the content sharing system. In some embodiments, remotely connected information handling systems such as 220, 222, and 224 may have been pre-arranged as targets for content sharing by the content sharing system 230. The remotely connected information handling systems such as 220, 222, and 224 may have code embedded in other embodiments to allow content sharing system 230 to initiate access automatically upon connection with network 240 monitored by the content sharing system. Content sharing system 230 may be set to monitor any size network including one or more WPANs, WLANs, or other networks discussed. Upon approvals being granted by the remotely connected information handling systems such as 220, 222, and 224 and by the content sharing system 230, navigation and access to files and content may be permitted via a content sharing system desktop. Security for pre-approved content sharing may streamline the access and navigation process for the content sharing system 230 in some embodiments. The content sharing system 230 may then provide device environment-representative windows on the content sharing desktop to assist in navigation of the plurality of remotely connected information handling systems such as 220, 222, and 224 despite varying OS, architecture, and hardware.

In another aspect of the present disclosure, the content sharing system 230 may enable remotely connecting devices such as 220, 222, and 224 to auto-pair wirelessly to the host information handling system 210 or remote data center 290 operating the content sharing system in some embodiments. The auto-pairing, which includes pairing to a wireless network and auto-initiation of access to the content sharing system, may be pre-approved and permit approved remotely connecting information handling systems to efficiently be integrated into the content sharing system 230. Pre-approval may occur via data or code provided to some remotely connecting information handling systems 220, 222, and 224 in advance of connecting to a network 240 monitored or associated with the content sharing system. Auto-pairing may also provide efficient and pre-approved access to network 240 by providing passcodes or other information needed to pair with the wireless network in other embodiments. Similarly, connection requirements to pair a remotely connected information handling system such as 220, 222, and 224 with the content sharing system 230 may be provided to permit auto-initiation of access between the content sharing system 230 and the connecting device. Auto-pairing and auto-initiation are discussed further herein.

In another aspect, automatic execution of an aggregation of files may take place upon remote connection by a plurality of information handling systems such as 220, 222, and 224 to a content sharing system 230 for one or more file types to be aggregated to allow a user to compare and review files. Review of categorized files, for example, may be desirable to determine the scope of data and files stored across the systems or determine differences between similar or parallel files stored among the remotely connected information handling systems such as 220, 222, and 224. Other automatic execution of applications and data files are also contemplated upon remote connection and confirmed accessibility of the content sharing system 230 and remotely connected information handling systems such as 220, 222, and 224.

In other aspects of the present disclosure, upon determination that one or more remotely connected information handling systems such as 220, 222, and 224 are accessible via the content sharing system 230, the content sharing system 230 may auto-execute certain files and data via applications on one or more information handling systems connected within the WPAN or WLAN network. For example, upon connecting to the content sharing system 230, commands may be established to automatically operate an application and execute one or more files. For example, as preferences are learned by the system, a media player may determine favored music file lists from among the one or more remotely connected information handling systems such as 220, 222, and 224 and to play music from that computing device.

In yet other aspects of the present disclosure, remotely connected information handling systems 220, 222, and 224 may be owned or operated by a plurality of users or organizations. In some cases, content sharing system 230 may be used with remotely connected information handling systems 220, 222, and 224 under control of one user. In other instances, remotely connected information handling systems 220, 222, and 224 may be from a variety of users. For example, a group of collaborative users from an organization may use the content sharing system 230. Use of such the content sharing system 230 for communication, control, and operation of remotely connected information handling systems 220, 222, and 224 may pose problems with respect to security, privacy or other considerations when devices originate from multiple sources. As a result, the content sharing system may be set to classify remotely connected information handling systems 220, 222, and 224 according to roles they play for their user or users. Based on the roles played by remotely connected information handling systems 220, 222, and 224, the content sharing system 230 may implement role-based policies to limit functions of the content sharing system such as those functions described above. Setting role-based policies may be according to specific file types, metadata, expected purpose of files, identified users, or purposes of remotely connected computing devices as well as other factors described further below. Role-based policy settings may come from a policy control interface or may be received from remotely connected information handling systems 220, 222, and 224 as set by IT administrators for those devices.

Figure 3:
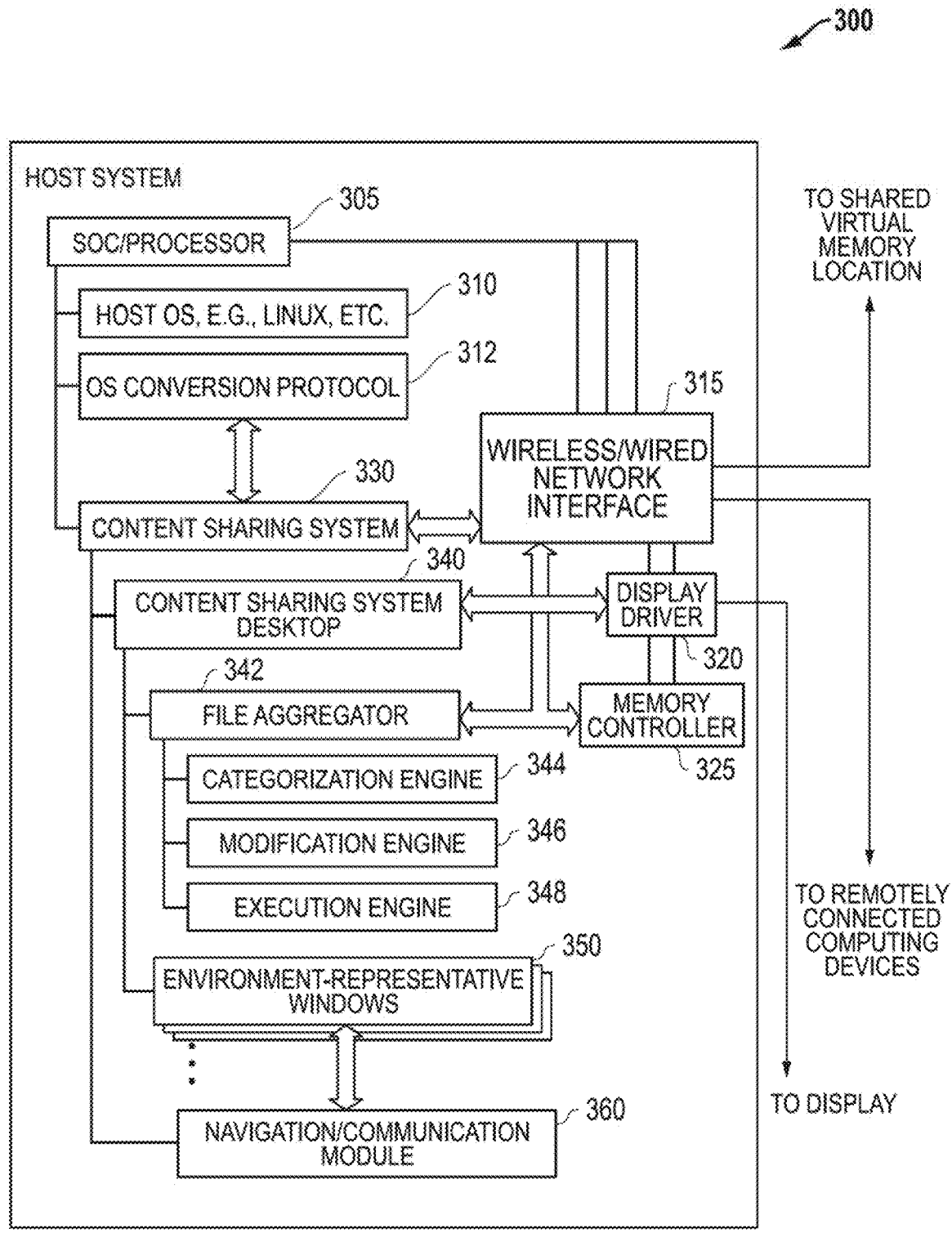
FIG. 3 is a block diagram illustrating a content sharing system according to one or more embodiments of the present disclosure.

FIG. 3 is a block diagram showing a hosted content sharing system 300 according to an embodiment of the present disclosure. The content sharing system host has a processor or an application specific processor 305 for executing instructions to operate the content sharing system 330 on host 300. Processor 305 may be connected via one or more buses as described above to components including a wireless or wired network interface device 315, a display driver 320, or a memory controller 325.

In an example embodiment, the processor 305 operates a host operating system (OS) 310 that may include Linux or another available operating system. In some embodiments, host operating system 310 may be a thin OS with association with a host application at a remote data center. Content sharing system host 300 further includes an OS system conversion protocol 312. The OS conversion protocol 312 may include executable code instructions to detect an operating system or system architecture of remotely connected information handling systems or their files. The OS conversion protocol will enable the files to be accessible by the content sharing system 330, navigated and communicated with via a navigation/communication module 360 of the content sharing system 330, and for functions to be performed or commands executed on the files from various remotely connected information handling systems. For example, a file aggregator 342 may collect and aggregate all or a subset of available files from the various remotely connected information handling systems to a local or remote shared memory location. A categorization engine 344 may compare files from the various remotely connected information handling systems based on location, timestamps, sources of data, file types, cues from metadata and content and other factors to categorize and arrange the aggregated files in a variety of ways as described.

Modification engine 346 may allow the content sharing system 330 to make modifications to the aggregated files in shared storage and reflect those changes on the remotely connected information handling systems where permitted. For example, a file may be copied between two environment-representative windows 350 of the information handling system via a copy short cut command or a drag and drop in the content sharing system desktop 340. This copying may be done via a shared storage system and with OS conversion protocol to transfer the file. In other embodiments, a transfer or copy function may be executed directly between remotely connected computing devices.

Execution engine 348 allows the content sharing system 330 to execute files or applications in shared storage or on remotely connected information handling systems via commands from the content sharing systems 330. In an embodiment, commands may come through the content sharing system 330 from other remotely connected information handling systems where permitted. For example, an auto execution of certain files may be set to run upon detected connection of remotely connected information handling systems with the content sharing system 330 or after aggregation of files by the file aggregator 342. In an example embodiment, a play list of audio files may be aggregated from a plurality of remotely connected information handling systems and an auto play feature may be initiated from the aggregated audio files. Play may proceed by favorites or preferences set by a user. In another example, data may be collected from one or more wearable fitness devices and analysis software may be auto executed upon detection of interfacing with the content sharing system 330. Viewable fitness data, both new and historic, may be auto-executed for viewing with a fitness tracking application.

The OS conversion protocol 312 may include use of kernel drivers for the OS system of the host 300. Additionally, one or more media sharing programs are available for use, all or in part, as an OS conversion protocol to communicate and interpret alternate OS systems and file structures for remotely connected information handling systems. For a variety of OS systems, conversion of certain file types may also be needed for functions such as aggregation or file transfer which will also be accomplished by an OS conversion protocol 312. In some embodiments, content sharing system 330 may communicate, interpret, or execute content files from a variety of remotely connected source computing devices via conversion to one or more common file types. The functions of aggregation and file transfer exchanges may then be done via the content sharing system according to several embodiments in the present disclosure. For example, conversion to IP protocol such as FTP may be appropriate for certain file types.

Display driver 320 will drive a display associated with the host 300 or may drive a remote display. Content sharing system 330 may have a module for establishing a content sharing system desktop 340 that may be displayed in an attached display device or a remote display. In other embodiments, the content sharing system desktop 340 generated by the content sharing system 330 may be displayed on a remotely connected information handling system, for example, via a wireless or wired network interface. An example embodiment of a content sharing system desktop 340 is discussed further below but will include a plurality of computing device environment-representative windows 350 corresponding to remotely connected information handling systems accessed by the content sharing system 330. Those device environment-representative windows 350 may include a file tree for navigation of files available to the content sharing system 330. Navigation/communication module 360 allows for interaction with the device environment-representative windows 350 to navigate with or communicate commands with the applications on remotely connected information handling systems. Additionally, navigation/communication module 360 facilitates interaction with the device environment-representative windows 350 to interface with aggregated files in shared storage via memory controller 325 or network interface 315. Navigation/communication module 360 may be instrumental along with host OS 310 and processor 305 in administering limitations on the content sharing system based on role-based policies determined to provide ways to wall of sets of files and content from content sharing functions or from specific role-classified remotely connected computing devices.

In another embodiment, images of a desktop from one or more remotely connected information handling systems is partially or completely replicated in a corresponding device environment-representative window 350 of the content sharing system desktop 340. In other embodiments, visual cues in the content sharing desktop and device environment-representative windows may be used to identify remotely connected computing device role classifications. In some embodiments, visual cues in the content sharing system desktop and device environment-representative windows may indicate application of content sharing system limitations according to role-based policies.

Memory controller 325 may connect externally directly or via a network interface with a virtual remote memory as shown or may interface with a local shared memory storage. The virtual remote memory or local memory may serve as a shared memory for the content sharing system. Shared memory may be used for navigation of files from remotely connected information handling systems by the content sharing system 330. Additionally, a shared memory, local or remote, may be used by a file aggregator 342, categorization engine 344, modification engine 346, and execution engine 348 during aggregation of files from a plurality of remotely connected information handling systems. Modification engine 346 and execution engine 348 may also directly communicate via navigation/communication module 360 with applications or files on remotely connected information handling systems as well.

Figure 4:
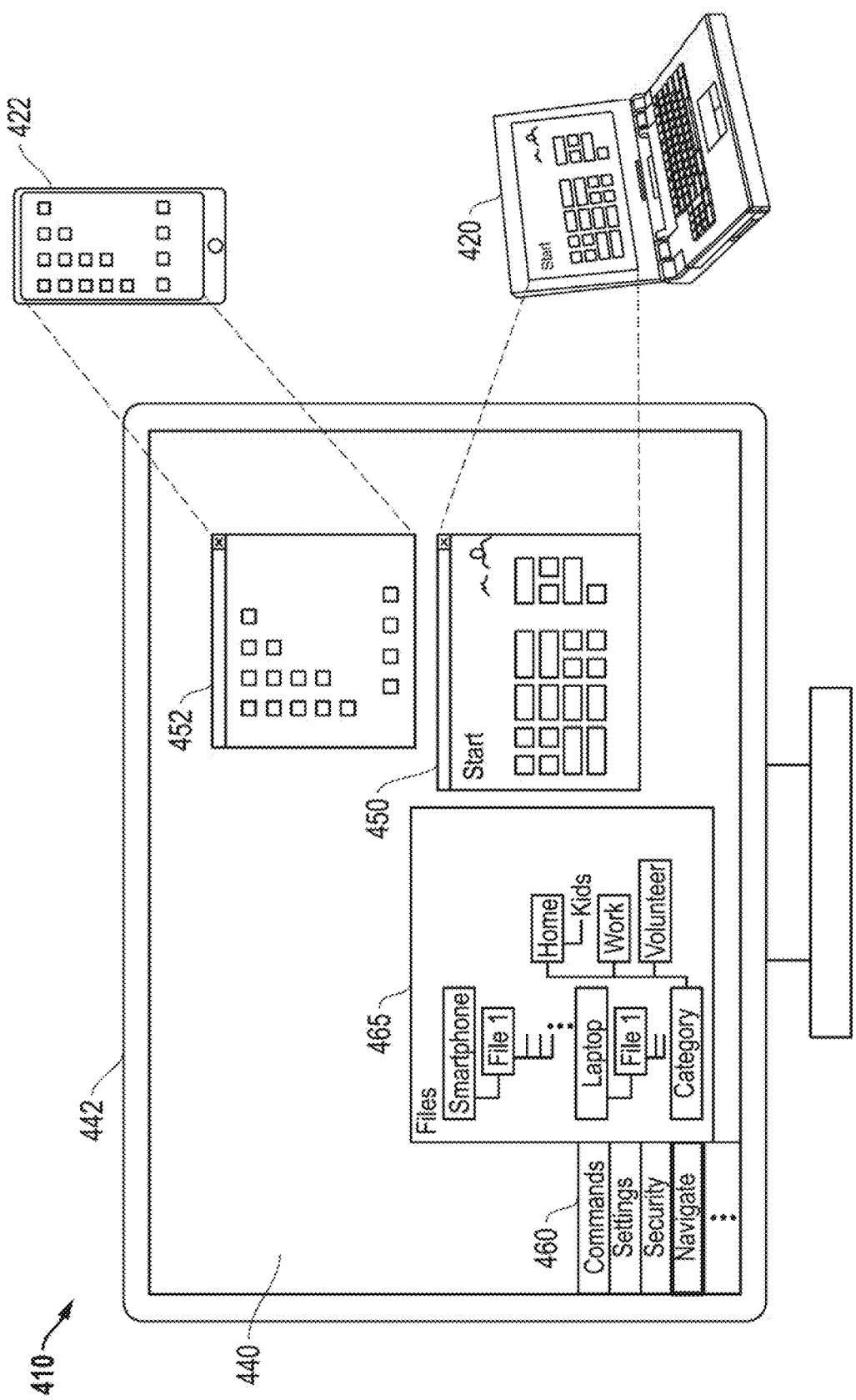
FIG. 4 is a display image diagram illustrating a graphic user interface (GUI) for content sharing system desktop according to an embodiment of the present disclosure.

FIG. 4 is a system 410 depicting content sharing system desktop 440 on a display device 442 associated with a host system of a content sharing system as described in the present disclosure. Remotely connected information handling system 420 is shown with a corresponding device environment-representative window 450. Remotely connected information handling system 422 is shown with a corresponding device environment-representative window 452. In the present embodiment, device environment-representative windows 450 and 452 are shown as having a complete or partial replication of the desktop interface found on the remotely connected information handling systems 420 and 422. A screen scrape of the remotely connected information handling systems 420 and 422 may be used to replicate the remotely connected computing device user interfaces. The content sharing system navigation module may then assist with navigation of the remotely connected information handling systems 420 and 422 via the device environment-representative windows 450 and 452. Icons in the device environment-representative windows may be operated and commands may be executed remotely via a RDP or other virtualization protocol with an execution engine and modification of files may be modified accordingly with the modification engine. In other embodiments, a file tree structure may be used with respect to one or more of the device environment-representative windows instead as described herein.

A file tree structure is shown in 465, but represents navigation and communication with aggregated files received from a plurality of remotely connected information handling systems such as 420 and 422. In FIG. 4, aggregated file tree structure 465 may be organized according to remotely connected information handling system source devices 420 and 422. In another embodiment, aggregated files may be categorized according to a category designation that may be assessed and learned by the content sharing system. For example in an embodiment, categories include home file, a sub file relating to kids, a work file, and a volunteer activity file. Other categorizations are contemplated as is understood. A command bar 460 is also shown in content sharing system desktop 440 and may be supported by the host operating system of the content sharing system of the present disclosures. The command bar 460 may include commands for copying, aggregating, sorting, execution of files and applications of the host for the content sharing system or for remotely connected information handling systems such as 420 and 422. Additionally, command bar 460 may include ways to interface with content sharing system settings, security, or navigation tools for files and data to facilitate the more seamless communication and utilization of files and applications from among the plurality of remotely connected information handling systems. Settings may include preferences relating to auto-initiation of content sharing including identification of remotely connected information handling systems, preferences for aggregation of files, determination of features of the device environment-representative windows, aggregation parameters and categorization selections and other settings. The content sharing system desktop 440 may also have icons (not shown) for initiating various operations of the content sharing system. For example, content sharing system desktop icons may link to external sites for uploading or downloading data or files. In another example embodiment, content sharing system desktop icons may to applications available on the content sharing system or to initiate specific content sharing system functions.

Figure 5:
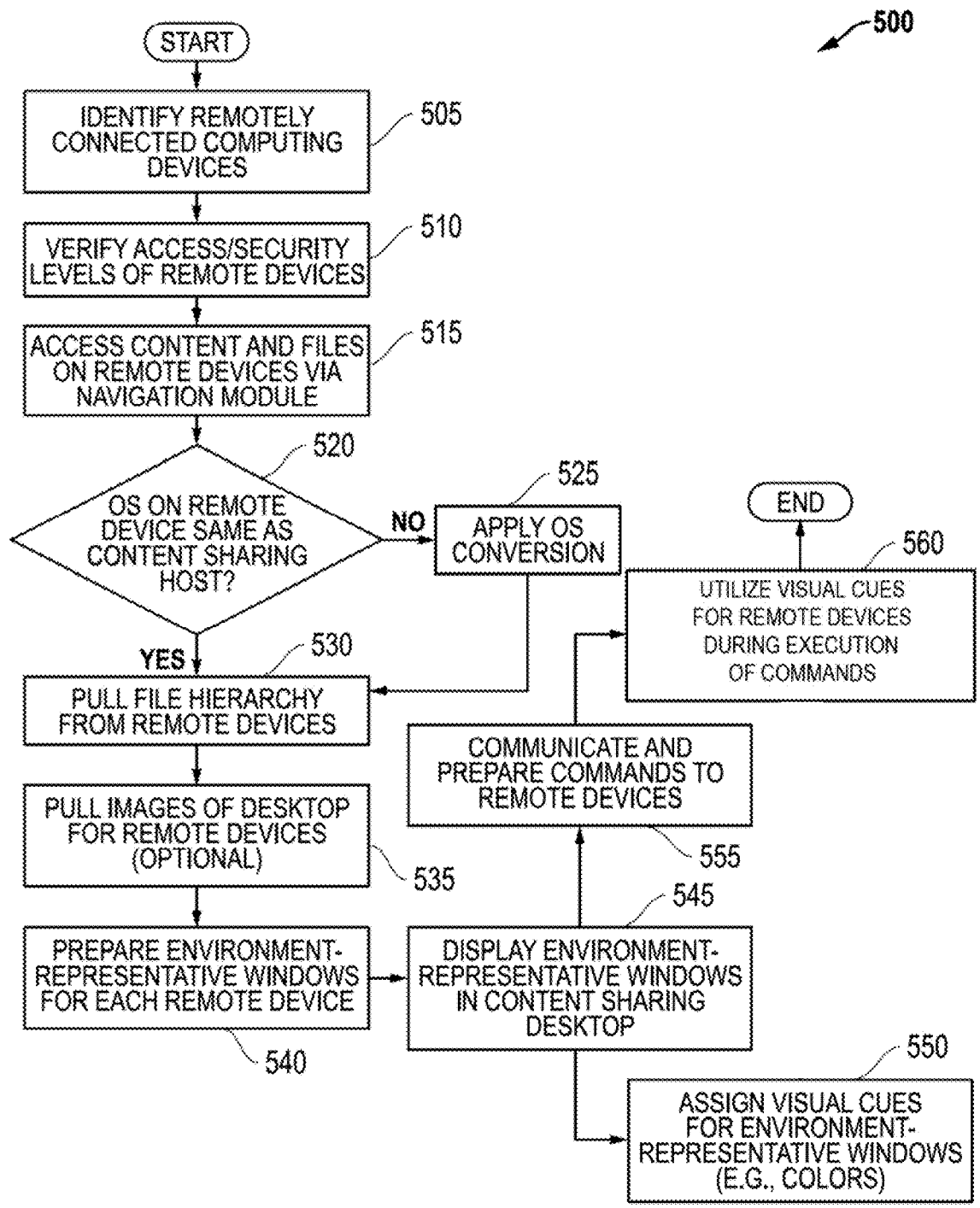
FIG. 5 is a flow diagram illustrating a method of navigation via a content sharing system according to an embodiment of the present disclosure.

FIG. 5 is a flow diagram showing a method of content sharing among remotely connected information handling systems according to an embodiment of the present disclosure. Method 500 begins at block 505. At block 505, the content sharing system identifies remotely connected information handling systems for pairing to the content sharing system. In an example embodiment, the remotely connected information handling systems may be connected wirelessly to the host system for the content sharing system or via a wired connection. Connection may be via a WPAN such as Bluetooth detection or via a WLAN connection or other wireless connections as described herein in certain embodiments. Detection may come about via an identification of remotely connected information handling systems by unique identifiers cross referenced with an approved list of computing devices accessible by the content sharing system. In another example embodiment, application code on a remotely connected information handling system may initiate identification of the connected information handling system as accessible by the content sharing system. In other instances, a user may initiate content sharing at the remotely connecting information handling systems by requesting accessibility to the content sharing system after remote connection to the WPAN or WLAN.

In one example embodiment, the detection and access routine may be auto-initiated upon an information handling system being connected to one or more WPANs or WLANs being monitored by the information handling system. In another example embodiment, the access to a remotely connected computing device may be an auto-initiation upon connection to one or more WPANs or WLANs having a content sharing system. As part of automatic initiation of access to a remotely connected information handling system, an RDP for virtualization of the remotely connected information handling system may be initiated. In other examples, a cookie or other code may be enabled to communicate availability of the remotely connected information handling system to the content sharing system upon connection to a WPAN or WLAN monitored by the content sharing system. In yet other embodiments, the content sharing system may request access to newly connected information handling systems to a monitored WPAN/WLAN if access is not already approved.

Proceeding to block 510, the content sharing system may verify access or security levels set by an administrator of the content sharing system. The access security levels may include security controlling access to the content sharing system by a remotely connected information handling system. Verifying access and security levels at 510 may also include a determination of whether a remotely connecting computing device permits access to its files, and if so, whether some files and applications are restricted. In another embodiment, the content sharing system may determine security risks posed by one or more remotely connecting computing devices to the content sharing system. For example, the content sharing system may determine whether access by a remotely connected information handling systems not behind a firewall may access applications, files and data of another remotely connected computing device under firewall protection. The content sharing system may identify restrictions for cross access between the computing devices or by the content sharing system. It is understood that security and access measures may be taken in accordance with measures understood in the art.

If security is determined acceptable by the content sharing system settings, and access is granted to the content sharing system, the navigation module of the content sharing system may initiate access at block 515 to permitted files and applications on one or more remotely connected information handling systems. Access at block 515 may be via a RDP or other virtualization protocol for example.

Proceeding to decision block 520, the content sharing system will determine whether the OS on the remotely connected information handling system matches that of the content sharing system host. In other embodiments, the content sharing system may determine if the OS of the remotely connected information handling system is compatible with the OS of the content sharing system host computing device. In either embodiment, if the OS is not the same or compatible, the flow proceeds to block 525. At block 525, the content sharing system will utilize its OS conversion protocols to enable communication with or access to applications and files on the remotely connected information handling system. Several example OS conversion protocol embodiments are discussed above. Those, and similarly understood OS conversion protocols, are available for use with the disclosure herein.

Upon implementation of the OS conversion protocol or a determination that the remotely connected information handling system uses a similar or compatible OS to that of the content sharing system host, the flow then proceeds to block 530. At block 530, the content sharing system pulls a hierarchy of files and applications with permitted access from the remotely connected information handling system. The content sharing system navigation module uses this file hierarchy or menu to access files and content on the remotely connected information handling systems.

Flow may proceed to block 535. For embodiments where a computing device environment-representative window replicates a remotely connected information handling system desktop, the content sharing system may pull images of the remotely connected desktop including icons, control bars, and other features at block 535.

The flow proceeds to 540 where this desktop image data may be used to create a content sharing system desktop and interface with the navigation module to establish navigation and control over the remotely connected information handling system via the corresponding device environment-representative windows. As explained, some device environment-representative windows of the content sharing desktop may simply display a file tree hierarchy. Other file and application navigation theme may be used in other embodiments. In embodiments where remotely connected information handling system desktop images are available, the device environment-representative window may replicate all or part of a corresponding remotely connected information handling system desktop.

Proceeding to block 545, the content sharing system may display the device environment-representative windows in the content sharing desktop on a local or remote display associated with the content sharing system.

At block 550 the content sharing system may assign visual cues to the device environment-representative windows. Colors, shading or other visual cues may be used to indicate which device environment-representative windows are active or which windows are currently being utilized via the content sharing system. Other visual cues within the device environment-representative windows may indicate ongoing execution of commands on the remotely connected information handling system, to indicate limited access to files and applications on the remotely connected information handling system, or even to indicate activity of specific applications or files within the device environment-representative windows representing the remotely connected information handling system.

At this point, flow proceeds to block 555 where the content sharing system communicates and prepares commands to the remotely connected information handling systems via a navigation and communication module. Such commands may come via a user using a systems settings user interface of the content sharing system desktop or may be set up as auto initiated by a user or administrator should certain conditions be met. In an embodiment, the navigation module is linked with the device environment-representative windows to permit navigation and communication of commands with a plurality of remotely connected information handling systems of the content sharing system.

Proceeding to block 560, the content sharing system desktop may also use a set of visual cues in the content sharing desktop to indicate when the content sharing system is executing commands on one or more remotely connected information handling systems or functions of the content sharing system such as aggregation. In an example, a visual cue may indicate that a file is or has been copied between two remotely connected information handling systems from one device environment-representative window to another device environment-representative window. In another example, an image, video or audio file may actively be being used via the content sharing system or an application on one remotely connected information handling system may be running and visual cues may indicate the same. In another example embodiment discuss in further detail herein, visual cues may indicate in device environment-representative windows which files or content are aggregated by the content sharing system and how those files are categorized. At this point the flow may end. It is understood that the sequence of steps for the method blocks depicted in FIG. 5 is not limiting and may occur in any order or some blocks may not occur at all during optional embodiments of the present disclosures.

Figure 6:
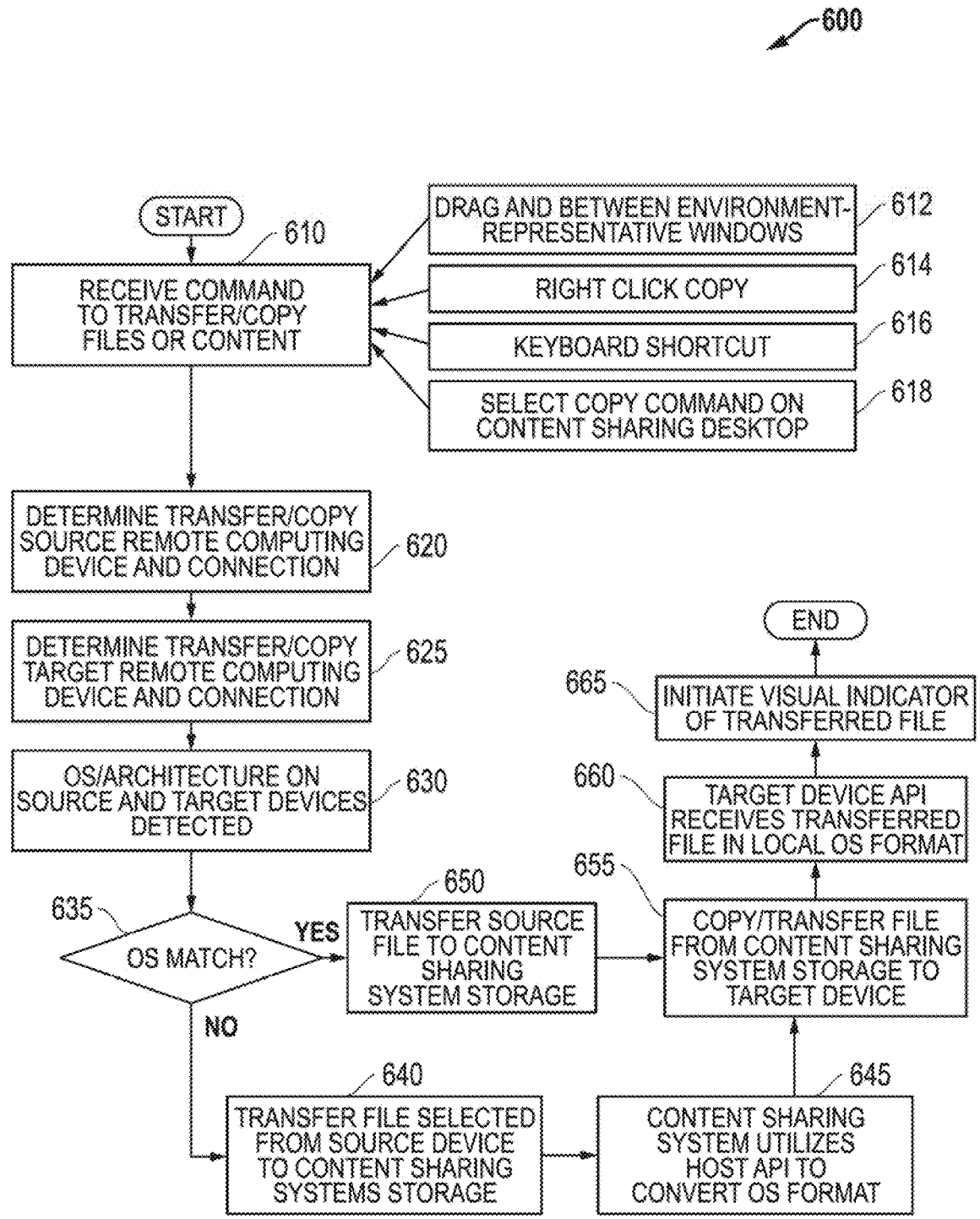
FIG. 6 is a flow diagram illustrating a method of exchange of file content via a content sharing system according to an embodiment of the present disclosure.

FIG. 6 is a flow diagram showing a method for navigation and exchange of shared content via a content sharing system according to an embodiment of the present disclosure. Method 600 begins at block 610 where a command is received via the content sharing system to transfer or copy files and content between a plurality of device environment-representative windows. The content sharing system desktop may facilitate a number of ways for a user to execute a copy or transfer command. For example, a file may be selected in a device environment-representative window and dragged to a second device environment-representative window as in 612. In another example embodiment, a right click copy or transfer command may be received by the content sharing system desktop as in block 614. A keyboard shortcut for copy or transfer may be used in yet another embodiment such as block 616. In yet another embodiment, as in block 618, a copy or transfer command may be selected from a command bar or menu of the content sharing system desktop. Other copy or transfer commands may be indicated by a user through the content sharing system desktop.

Upon receiving a copy or transfer command, the flow proceeds to block 620. At 620, the content sharing system determines the source remotely connected information handling system and the connection with that remotely connected computing device and the content sharing system. Proceeding to block 625, the content sharing system similarly determines the target remotely connected information handling system as a recipient of the transferred or copied content and the connection with that remotely connected system.

Proceeding to 630, the content sharing system determines the OS or system architecture of the source and target remotely connected information handling systems. At decision block 635, the content sharing system determines if there is a match between the OS of the source and target remotely connected information handling systems. Similarly, detection of the system architecture match for the source and target remotely connected information handling systems in another embodiment may be detected to determine if a conversion needs to be made by the OS conversion protocol module of the content sharing system.

If no match of OS, the flow proceeds to 640 where a transferred file is selected from the source remotely connected information handling systems via the navigation module of the content sharing system. The transferred file is stored in shared storage of the content sharing system which may be local or remote storage associated with the hosted content sharing system. Proceeding to 645, the content sharing system utilizes a host API including plug-ins or other available OS conversion protocol features to convert the file format to conform to or work compatibly with the target remotely connected information handling system. In some embodiments, the conversion may be to a standard file format utilized by the host OS for storage as an intermediate step before conversion to an OS type for the target remotely connected information handling system. The flow then proceeds to 655 where the content sharing system executes a copy or file transfer from the content sharing system storage to the target remotely connected information handling system. If the OS matches at decision block 635, the flow proceeds to 650 where the content sharing system stores the transferred file in shared storage of the content sharing system. As before, the flow then proceeds to 655 where the content sharing system executes a copy or file transfer from the content sharing system storage to the target remotely connected information handling system.

Upon execution of the copy or transfer of the transferred file to the target remotely connected information handling system, the target remotely connected information handling system receives the transferred file via an API in local OS format at 660. Proceeding to 665, the content sharing system then initiates a visual cue at the source and/or target device environment-representative windows in the content sharing system desktop to indicate the change in status of the file or execution of the transfer command. At this point the flow may end. It is understood that the sequence of steps for the method blocks depicted in FIG. 6 is not limiting and may occur in any order or some blocks may not occur at all during optional embodiments of the present disclosures.

Figure 7:
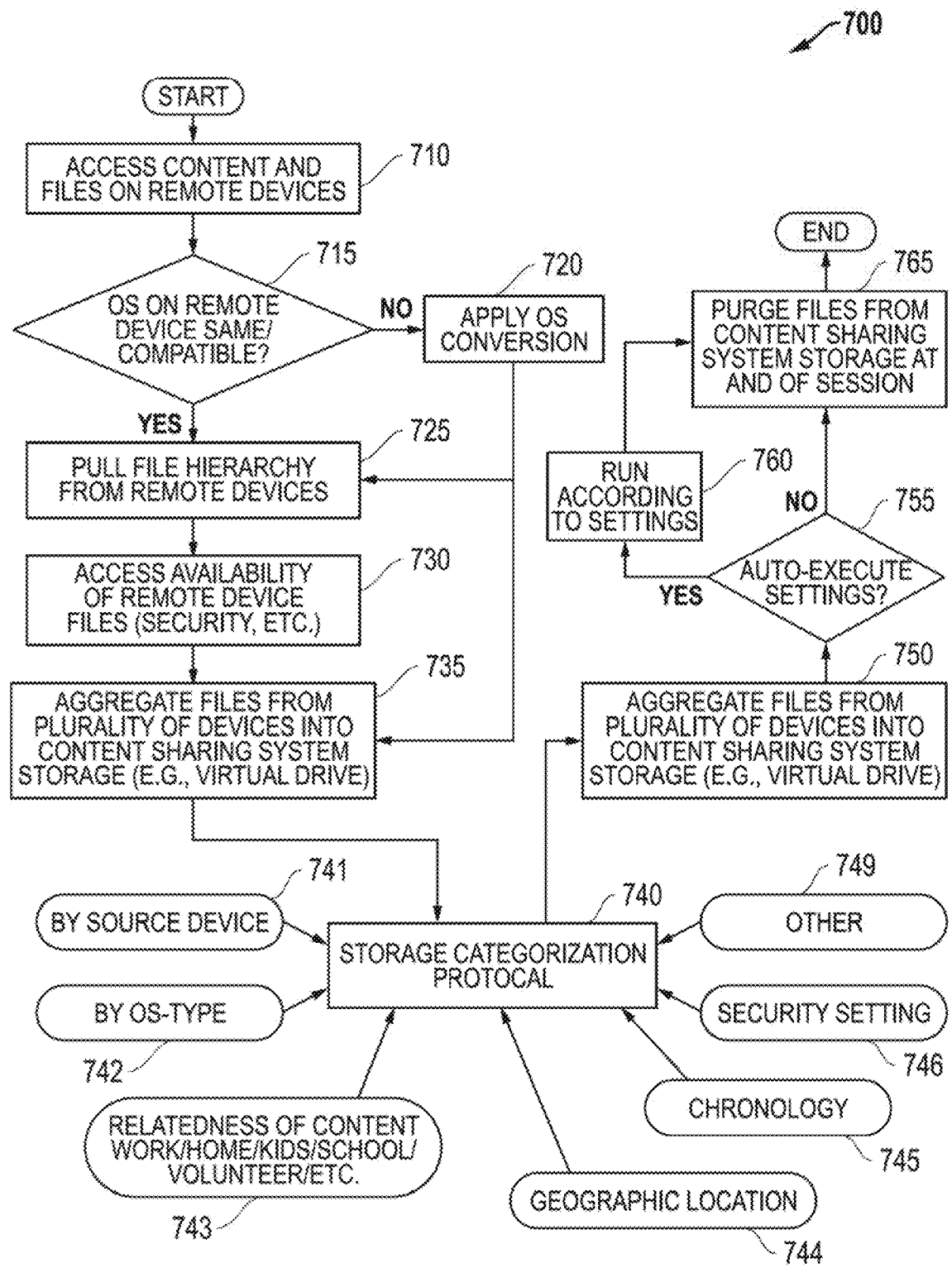
FIG. 7 is a flow diagram illustrating a method of aggregation and organization of file content from a plurality of remotely connected computing devices via a content sharing system according to an embodiment of the present disclosure.

FIG. 7 is a flow diagram showing a method for navigation and aggregation of shared content via a content sharing system according to an embodiment of the present disclosure. Method 700 begins at block 710 where the content sharing system gains access to content and files on a plurality of remotely connected information handling systems in accordance with the above described disclosure. In an example embodiment, a navigation module of the content sharing system obtains successful access to the remotely connected information handling systems. This enables navigation of available files on the remotely connected information handling systems via the content sharing system. In an embodiment, the access is auto-initiated as described above.

Proceeding to decision block 715, the content sharing system determines whether the OS on the remotely connected information handling systems yielding access to files and content are the same or compatible to the OS of the host of the content sharing system. If not, the flow proceeds to block 720, where one or more OS conversion protocols are implemented by the content sharing system to make access of the files and content available to the navigation module. The flow proceeds to block 725 after OS conversion. Alternatively, if an OS match or compatibility is found in decision block 715 flow proceeds to block 725.

At block 725, the content sharing system pulls file hierarchies from a plurality of remotely connected information handling systems. This may be used, as in other embodiments, to generate device environment-representative window in the content sharing system desktop.

Proceeding to block 730, the content sharing system may determine which files and content are not restricted by security measures implemented by the remotely connected information handling systems or instituted by the content sharing system to prevent cross accessibility between computing devices. For example, the content sharing system may restrict access between remotely connected information handling systems having differing security levels such as firewall protections or the like by determining the security status of the plurality of remotely connected information handling systems.

The flow proceeds to 735 where the content sharing system utilizes a file aggregator to pull accessible files and content from a plurality of remotely connected information handling systems. The files and content copied from the plurality of remotely connected information handling systems may be stored into a remote or local shared storage for the content sharing system.

Proceeding to block 740, a categorization engine of the content sharing system may be initiated. The content sharing system will begin a shared storage categorization protocol according to settings of a user or administrator of the content sharing system. Several categorization themes are shown as example embodiments. At 741, the aggregated files may be categorized and sorted by type of remotely connected information handling system to source the files. At 742, the aggregated files may be categorized and sorted by OS-type of the originating remotely connected information handling systems. At 743, the aggregated files may be categorized and sorted by relatedness of content. Example relatedness categories may be files associated with work, home, kids, school, volunteer activities, hobbies, and so forth. Determination of categorizing these files may come from determination of a number of factors as described above including chronology, location, source computing devices, metadata clues, file types or application types used to run those files, content clues such as names or other descriptive terms to name a few example criterion for determining relatedness categorizations. At 744, the aggregated files may be categorized and sorted by geographic location of where files were created. For example, geotag information may be used to categorize files. At 745, the aggregated files may be categorized and sorted by chronology based on timestamps relating to file creation. This may be varied according to earliest creation time of files, latest versions, or other timestamp factors of any time in between. At 746, the aggregated files may be categorized and sorted by security setting levels whereby files may be ranked by sensitivity of content. This may include determining sensitivity levels for files based on protection behind one or more firewalls, encryption, pass code protection, designation in the files, or other security factors. At 749, it is contemplated that the aggregated files may be categorized and sorted by any number of other categorization approaches. This may include multiple combinations of the recited bases for categorization of aggregated files and additional sorting and categorizations commonly used with varying file types likely to be aggregated from the plurality of remotely connecting information handling systems.

The flow proceeds to block 750 where files are aggregated by a file aggregator of the content sharing system by copying the accessible files from a plurality of remotely connected information handling systems into a shared memory of the content sharing system. The categorization engine applies a categorization protocol as described above to sort the aggregated files from the plurality of remotely connected information handling systems into a navigable hierarchy of files and sub-files arranged by the aggregation engine. The content sharing system makes the aggregated files navigable and accessible by users of the system. In an example embodiment, navigation of the aggregated files may be via a file hierarchy on the content sharing system desktop. In other embodiments, which may depend on security settings amongst the plurality of remotely connected information handling systems, the aggregated files may be navigated from one or more remotely connected information handling systems via the content sharing system. In this way, organization and navigation of files from a plurality of remotely connected information handling systems, some with varying OS and file architectures, may be accessed more seamlessly via one location. In another example embodiment, the aggregation of permitted files from the remotely connected information handling systems may be auto-aggregated upon detection of the remotely connected information handling system via the WPAN, WLAN or other network connection by the content sharing system. In various embodiments, auto-aggregation may take place upon similar connection identification techniques to those described elsewhere with respect to initiation of a navigation module of the content sharing system. For example, auto-aggregation may occur by detection of a connection and sending a request for access to a remotely connecting information handling system. In other examples, a list of systems with unique identifiers that may be remotely connected to the content sharing system may be stored by the content sharing system and auto-initiate aggregation should a unique identifier match. It is understood that each remotely connected information handling system may have a plurality of unique identifiers depending upon the network type through which it is connected. For example, a WPAN identifier may be different from a WLAN identifier. In other instances they may be the same. In yet another embodiment, software code such as an application or cookie on a remotely connected information handling system may identify that the system is accessible by the content sharing system upon connection.

The flow proceeds to decision block 755 where the content sharing system determines whether auto-execution settings for applications and files from one or more remotely connecting information handling systems have been triggered. If so, the flow proceeds to block 760 where the content sharing system provides for execution of commands according to the settings of a user or an administrator to run a program or application. The program or application may be run by a remote desktop protocol or similar system for virtual control over a remotely connected information handling system. In other instances, the program or application may be run directly from the host system for the content sharing system. The files utilized by a program or application whether run through a remotely connected information handling system or on a host computing device of the content sharing system may be sourced from the aggregated files of the shared memory for the content sharing system. In other embodiments, the files on one or more remotely connected information handling systems may be used during auto-execution of programs or applications.

After auto-execution of programs or applications occurs, or if no auto-execution is detected, the content sharing system may proceed to a condition where the session with the content sharing system ends. This may occur via user or administrator ending the content sharing system at the host in an example embodiment. In other embodiments, the connection by a remotely connected information handling system may be terminated ending that remotely connected information handling system interface with the content sharing system. In yet other embodiments, the content sharing system may be ended automatically. For example, there may be a limitation on time periods for operation of a content sharing system with remotely connected information handling systems. In such an instance upon expiration of time, the content sharing system session may be ended automatically.

Proceeding to block 765 upon ending of a session with the content sharing system, the content sharing system may purge the aggregated files in shared storage copied from some or all remotely connected information handling systems. In the example of one or more individual remotely connected information handling systems terminating interface with the content sharing system, files and content aggregated from those terminated remotely connected information handling systems may be purged from the shared storage in an example embodiment. In other embodiments of the present disclosure, it may be desirable to host the aggregated files by the content sharing system even after one or more remotely connected information handling systems has terminated an interface. The aggregated files and content may continue to be reviewed and utilized in a number of capacities by a user. In an example embodiment of such a scenario, retention of aggregated files and content may be limited to situations where the remotely connected information handling systems are all owned or controlled by one user, household, business, or other organization where sharing content from multiple remotely connected information handling systems is desired. Upon ending a session of the content sharing system by the host, all aggregated files and content may be purged in certain embodiments. At this point the flow may end. It is understood that the sequence of steps for the method blocks depicted in FIG. 7 is not limiting and may occur in any order or some blocks may not occur at all during optional embodiments of the present disclosures.

Figure 8:
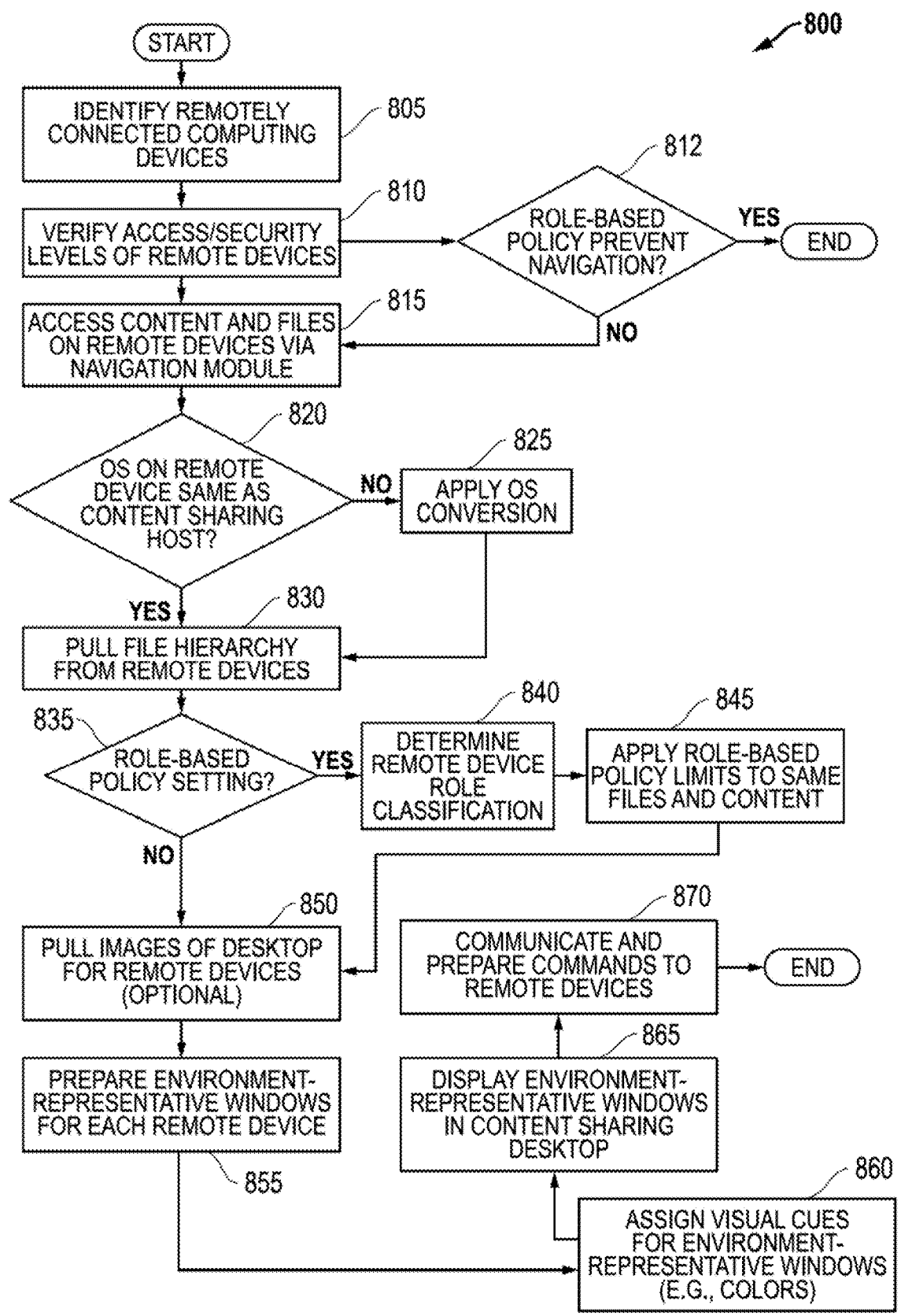
FIG. 8 is a flow diagram illustrating a method a method of implementing a content sharing system with role-based policy application according to an embodiment of the present disclosure.

FIG. 8 is a flow diagram showing a method of content sharing among remotely connected information handling systems according to an embodiment of the present disclosure. Method 800 begins at block 805. At block 805, the content sharing system identifies remotely connected information handling systems for pairing to the content sharing system. In an example embodiment, the remotely connected information handling systems may be connected wirelessly to the host system for the content sharing system or via a wired connection. Connection may be via a WPAN such as Bluetooth detection or via a WLAN connection or other wireless connections as described herein in certain embodiments. Detection may come about via an identification of remotely connected information handling systems by unique identifiers cross referenced with an approved list of computing devices accessible by the content sharing system. In another example embodiment, application code on a remotely connected information handling system may initiate identification of the connected information handling system as accessible by the content sharing system. In other instances, a user may initiate content sharing at the remotely connecting information handling systems by requesting accessibility to the content sharing system after remote connection to the WPAN or WLAN.

In one example embodiment, the detection and access routine may be auto-initiated upon an information handling system being connected to one or more WPANs or WLANs being monitored by the information handling system. In another example embodiment, the access to a remotely connected computing device may be an auto-initiation upon connection to one or more WPANs or WLANs having a content sharing system. As part of automatic initiation of access to a remotely connected information handling system, an RDP for virtualization of the remotely connected information handling system may be initiated. In other examples, a cookie or other code may be enabled to communicate availability of the remotely connected information handling system to the content sharing system upon connection to a WPAN or WLAN monitored by the content sharing system. In yet other embodiments, the content sharing system may request access to newly connected information handling systems to a monitored WPAN/WLAN if access is not already approved.

Proceeding to block 810, the content sharing system may verify access or security levels set by an administrator of the content sharing system. The access security levels may include security controlling access to the content sharing system by a remotely connected information handling system. At this point, an auto-pairing command may provide for access connection, pass codes, encryption codes and keys, and other pairing data to enable an automatic wireless connection between a remotely connected information handling system and a content sharing system. This auto-pairing with the content sharing system may include auto-initiation of access between the remotely connected device and the content sharing system in some embodiments. A WPAN such as Bluetooth, a WLAN connection, or other wireless connections may be subject to the auto-pairing with the information handling system hosting the content sharing system or the remote processing center that may host such a system. Verifying access and security levels at 810 may also include a determination of whether a remotely connecting computing device permits access to its files, and if so, whether some files and applications are restricted. In another embodiment, the content sharing system may determine security risks posed by one or more remotely connecting computing devices to the content sharing system. For example, the content sharing system may determine whether access by a remotely connected information handling systems not behind a firewall may access applications, files and data of another remotely connected computing device under firewall protection. The content sharing system may identify restrictions for cross access between the computing devices or by the content sharing system. It is understood that security and access measures may be taken in accordance with measures understood in the art.

Accordingly, the flow proceeds to decision block 812 where the content sharing system determines as an initial matter whether a role-based policy exists with respect to a remotely connected information handling system that prevents any navigation of files and content from that computing device by the content sharing system. The role-based policy may be sourced to the content sharing system from the remotely connected information handling system in some embodiments. In other embodiments, the role-based policy system may be user driven policy established via the content sharing system. For example, a content sharing system desktop may have commands or user interface access to a policy setting control interface in example embodiments. If navigation is prohibited by the content sharing system, the flow then ends.

If security is determined acceptable by the content sharing system settings and no prohibition on navigation of files and content exists by virtue of a role-based policy setting, access is granted to the content sharing system for the remotely connected information handling system pairing with the content sharing system. The navigation module of the content sharing system may initiate access at block 815 to permitted files and applications on one or more remotely connected information handling systems for navigation and review. Access at block 815 may be via a RDP or other virtualization protocol for example.

Proceeding to decision block 820, the content sharing system will determine whether the OS on the remotely connected information handling system matches that of the content sharing system host. In other embodiments, the content sharing system may determine if the OS of the remotely connected information handling system is compatible with the OS of the content sharing system host computing device. In either embodiment, if the OS is not the same or compatible, the flow proceeds to block 825. At block 825, the content sharing system will utilize its OS conversion protocols to enable communication with or access to applications and files on the remotely connected information handling system. Several example OS conversion protocol embodiments are discussed above. Those, and similarly understood OS conversion protocols, are available for use with the disclosure herein.

Upon implementation of the OS conversion protocol or a determination that the remotely connected information handling system uses a similar or compatible OS to that of the content sharing system host, the flow then proceeds to block 830. At block 830, the content sharing system pulls a hierarchy of files and applications with permitted access from the remotely connected information handling system. The content sharing system navigation module uses this file hierarchy or menu to access files and content on the remotely connected information handling systems paired to the content sharing system.

Upon pulling file hierarchy from remotely connected information handling systems by the content sharing system, flow proceeds to decision block 835. The content sharing system determines whether a role-based policy setting is in place to govern the sharing of content with the content sharing system or among a plurality of remotely connected computing devices with the content sharing system. If there is no role-based policy to be implemented, the flow proceeds to block 855. If there is to be role-based policy, some or all of the role-based policy may be received from the remotely connected information handling systems. For example, the role-based policy may be set by an information technologies administrator as part of an enterprise IT policy for those computing devices in some embodiments. The role-based policy may be user driven and established by a user via the content sharing system. The role-based policy may be set within a host operating system via BIOS, firmware, or an application as part of the content sharing system. For example, users may determine that some content and files may be limited by one or more classifications of remotely connected information handling systems for protection of the data from alteration or to protect privacy. Moreover, the content sharing system may merge policy inputs from one or more remotely connected information handling systems with role-based policy settings established at the content sharing system by users or from previous pairings with a computing device or other computing devices with a similar role classification.

With the setting of role-based policy, the flow proceeds to block 840 where the content sharing system may discern an appropriate role-based policy to deploy with respect to a session of the content sharing system with a plurality of remotely connected information handling systems connected. As described, role-based policy may be received from individual remotely connected information handling systems, may be set via the content sharing system such as a via a policy setting control interface. In certain embodiments, the role-based policy determined from multiple sources will depend in part on role classification of both source remotely connected information handling systems and classification of files, or file types. Initially, role classification may be discerned for remotely connecting information handling systems via database association of unique identifiers with an enterprise or individual as stored by the content sharing system. Additionally, review of files and systems on remotely connected information handling systems may determine a role classification of a paired remotely connected information handling system. At block 840, the content sharing system determines the role classification(s) for a remotely connected information handling systems paired to the content sharing system. Role classifications may invoke specific role-based policies to limit activity of the content sharing system and other remotely connected information handling systems.

Several role-based policy options are contemplated for limitation of the content sharing system and may be based on role classifications of computing devices paired with the content sharing system desktop. In certain embodiments, role-based policies for content sharing may limit the content sharing system from navigating through some or all files and content. In other embodiments, role-based policy may limit the content sharing system from issuing commands or communications affecting files and content. In additional embodiments, role-based policy may limit transferring or altering files and content, aggregating files and content via the content sharing system shared memory, executing code and content, or any combination of the above for each remotely content sharing system. Role-based policy limitations may pertain to remotely connected information handling systems paired to the content sharing system having a role classification such as "work", "personal", or other role classifications. Additionally, in other embodiments, role-based policies may limit any of navigation/access, commands and communications, transferring, altering, executing, or any combination of the above for files and content on a remotely connected information handling system as with respect to other remotely connected information handling systems with differing role classifications. In other embodiments, role-based policy may affirmatively set required actions by the content sharing system during operation such as requiring file transfers to be direct between computing devices or to use shared memory. In yet other embodiments, role-based policy may set forth approved actions or computing devices rather than prohibitions or limitations or any combination. Further variations on limitations, requirements, and approvals are contemplated. File types may be identified for limitation as part of a role-based policy within the entire content sharing system or limited only as from computing devices with certain role classifications. Time limits may set bounds for files and content according to timestamps to restrict activity of the content sharing system or remotely connected computing devices via the content sharing system. File security levels may be set for files on remotely connected information handling systems and limit activity of the content sharing system or remotely connected computing devices of designated role classifications.

Other metadata may indicate aspects of the files or content that may be a basis of role classification and restricting the content sharing system from access or manipulation. For example, an author, location, means of creation or software used, purpose of the file or content, or other types may be utilized as part of a role-based policy limitation on the content sharing system seamlessly accessing and making available files. For example, if a purpose of a file or content is identified with a specific project and it is desired that such content remain unavailable for content sharing it may be limited according to that metadata. In another example, certain types of data may be unavailable for content sharing due to limitations of copyright or authorship as may be indicated in metadata or in content body of files or data.

In yet other examples of role-based policies and their effect, assessment of content and files on remotely connected information handling systems may search and find terms relating to confidentiality levels of documents, ownership of content, or whether a file contains images. Matching images, terms, or other content may be used to indicate that a file is work-related, personal related, hobby-related, volunteer-related, or involving other activities as described above. These usage based classifications may be used to categorize aggregated files and data as above, or may be used to determine role classifications of a device or whether role-based policy aspects apply to the content or files analyzed. Role-based policies may therefore limit access or manipulation of files on remotely connected computing devices due to these file classifications by usage categories.

Flow proceeds to block 845 where role-based policy limits are applied to files and content accessed from the plurality of remotely connected computing devices paired to the content sharing system. For example, file types, file levels, metadata, content of files, and other data may be reviewed and classified as described above. Based on subset role classifications of files, the application of role-based policy may determine the limitations with respect to those remotely connected computing devices that serve as a source of those files and content. Then limitations on navigation, manipulation, transfer, and other activities via the content sharing system are placed according to the role-based policies. Accordingly in an embodiment, the seamless access, transfer, aggregation, utilization of content and files, and other content sharing functions across multiple remotely connected information handling systems may be tailored after auto-pairing with the content sharing system subject to role-based policies.

At block 850, the content sharing system may pull images of desktops from remotely connected computing devices if they are available. A pixel by pixel pull of data may be done to replicate the remotely connected computing device desktop in the device environment-representative windows in the content sharing system desktop. For embodiments where a device environment-representative window replicates a remotely connected information handling system desktop, the content sharing system may pull images of the remotely connected desktop including icons, control bars, and other desktop features at block 850.

The flow proceeds to 855 where this desktop image data may be used to create a content sharing system desktop and interface with the navigation module to establish navigation and control over the remotely connected information handling system via the corresponding device environment-representative windows. As explained, some device environment-representative windows of the content sharing desktop may simply display a file tree hierarchy. Other file and application navigation theme may be used in other embodiments. In embodiments where remotely connected information handling system desktop images are available, the device environment-representative window may replicate all or part of a corresponding remotely connected information handling system desktop.

In an embodiment, the flow proceeds to block 860 where the content sharing system may assign visual cues to the content sharing system desktop to indicate role classification for remotely connected information handling systems. In addition, role-based policies for remotely connected computing devices under certain role classifications may appear as visual cues indicating files that are limited according content sharing system functions. Visual cues may separately indicate limitations on identified files or content with respect to navigation or review, transfer or manipulation, aggregation, or other content sharing system functions. For example, the device environment-representative windows may utilize visual cues such as colors, shading, hatching or the like to indicate files which fall under limitations with respect to a given role classification. In other instances, files within the device environment-representative windows or within the file navigation of the content sharing system desktop may be grayed out or hatched out if unavailable for navigation or shaded or colored to indicate unavailability for transfer, aggregation, or manipulation. In various embodiments, colors, shading or other visual cues may be used to indicate within device environment-representative windows or the content sharing system desktop that files and content that are limited according to role-based policies. In other aspects, the visual cues may indicate that files and content are available and not subject to role-based policy limitations. Use of visual cues in the content sharing system desktop may employ either approach. These visual cues may be implemented in the content sharing system desktop along with other visual cues indicating ongoing execution of commands on the remotely connected information handling system, or even indicating activity of specific applications or files within the device environment-representative windows representing the remotely connected information handling system as described above.

Proceeding to block 865, the content sharing system may display the device environment-representative windows in the content sharing desktop on a local or remote display associated with the content sharing system. In an embodiment, the navigation module is linked with the device environment-representative windows as prepared by the content sharing system for each remotely connected information handling system. This will permit navigation and communication of commands with a plurality of remotely connected information handling systems of the content sharing system via respective environment-representative windows.

At this point, flow may proceed to block 870 where the content sharing system communicates and prepares commands to the remotely connected information handling systems via a navigation and communication module for files not limited by the role-based policy. Such commands may come via user interface of the content sharing system desktop or may be set up as auto-initiated by a user or administrator should certain conditions be met. It is understood that the sequence of steps for the method blocks depicted in FIG. 8 is not limiting and may occur in any order or some blocks may not occur at all during optional embodiments of the present disclosures. Additionally, aspects of other embodiments disclosed herein may be used along with the embodiment of FIG. 8.

Figure 9:
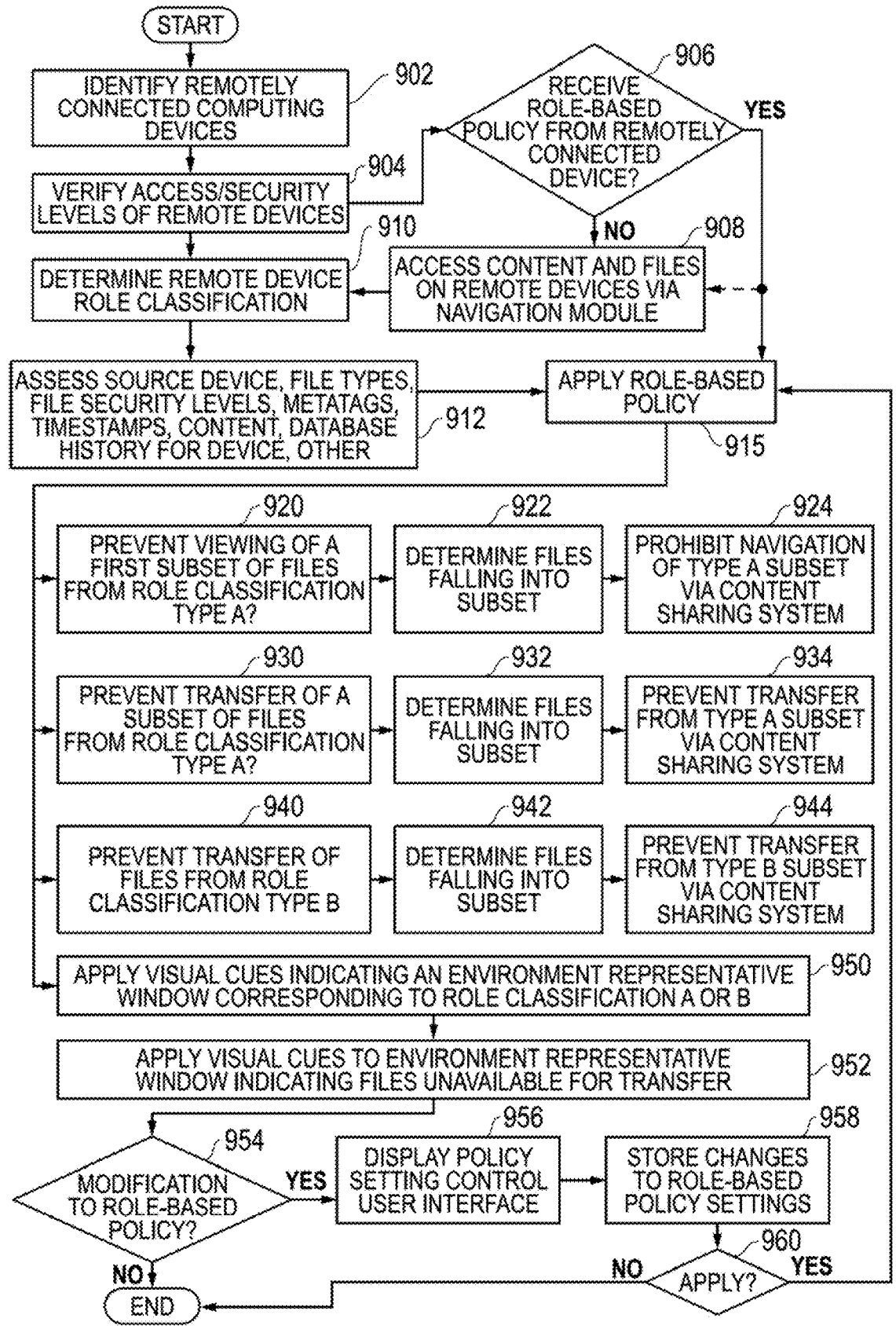
FIG. 9 is a flow diagram illustrating a method of application of role-based policy limitations for a content sharing system according to an embodiment of the present disclosure.

FIG. 9 is a flow diagram showing determination and assessment of role-based policies regarding remotely connected information handling systems via operation of the content sharing system according to an embodiment of the present disclosure. Method 900 begins at block 902 where the content sharing system determines that a plurality of remotely connected computing devices are available for pairing. In several embodiments, the content sharing system is available for more seamless navigation and manipulation of content from multiple wirelessly connected information handling systems although some computing devices may be connected via a hard-wired connection. At block 902, as described previously, the content sharing system identifies remotely connected information handling systems for pairing to the content sharing system. Detection may come about via an identification of remotely connected information handling systems by unique identifiers cross referenced with an approved list of computing devices accessible by the content sharing system. In other example embodiments, application code on a remotely connected information handling system may initiate identification of the connected information handling system as accessible by the content sharing system upon pairing with the content sharing system. Other identification mechanisms are contemplated as discussed elsewhere herein or variations as is understood by those skilled in the art.

Proceeding to block 904, the content sharing system may verify access or security levels set by an administrator of the content sharing system relating to remotely connected information handling systems. The content sharing system may cross reference pre-approved lists of unique identifiers permitted access or may work with other traditional security and access routines including encryption keys, pass codes, firewall access, and the like.

The access security levels may include security controlling access to the content sharing system by a remotely connected information handling systems in a similar fashion. Verifying access and security levels at 904 may also include a determination of whether a remotely connecting computing device permits access to its files, and if so, whether some files and applications are restricted. In another embodiment, the content sharing system may determine security risks posed by one or more remotely connecting computing devices to the content sharing system. For example, the content sharing system may determine whether access by a remotely connected information handling systems not behind a firewall may access applications, files and data of another remotely connected computing device under firewall protection. The content sharing system may identify restrictions for cross access between the computing devices or by the content sharing system. It is understood that security and access measures may be taken in accordance with measures understood in the art.

Additionally in some embodiments, the content sharing system is contemplated as commencing auto-pairing and auto-initiating of access via the content sharing system desktop. In an example embodiment, the detection and access routine may be auto-initiated upon an information handling system being paired with or connected to one or more WPANs, WLANs, or other network connections being monitored by the content sharing system. In another example embodiment, the access to a remotely connected computing device may be an auto-initiation upon connection to one or more WPANs, WLANs or other network having a content sharing system.

For example, an auto-pairing command may provide for access connection, pass codes, encryption codes and keys, and other pairing data to enable an automatic wireless connection between a remotely connected information handling system and a content sharing system. These may have been pre-loaded on remotely connecting information handling systems before auto-pairing is attempted and access to the content sharing system is initiated. Auto-pairing may be distributed via control plane communications or via regular data networks to remotely connected information handling systems before pairing. They may be included with cookies or as part of a kernel of code residing on the remotely connecting information handling system. A WPAN such as Bluetooth, a WLAN connection, or other wireless connections may be subject to the auto-pairing with the information handling system hosting the content sharing system or the remote processing center that may host such a system.

Accordingly, the flow proceeds to decision block 906 where the content sharing system determines whether a role-based policy is received from a remotely connected information handling system. As explained above, the role-based policy may be sourced to the content sharing system from the remotely connected information handling system in some embodiments. In other embodiments, the role-based policy system may be a user driven policy established via the content sharing system. For example, a content sharing system desktop may have commands or user interface access to a policy setting control interface in example embodiments. Finally, in yet other embodiments, a role-based policy regarding the content sharing system may be synthesized from a combination of policy elements received from remotely connected information handling systems, from user-driven at the content sharing system, and partially discerned from data collected about the remotely connected information handling systems or data and files thereon. The latter aspect is also relevant in application of the role-based policy implemented by the content sharing system. Depending on the embodiment, if a role-based policy is received from a remotely connected information handling system in some embodiments it may take precedence and the flow proceeds to block 915 to apply the role-based policy received. In other embodiments, the received role-based policy element is a factor in determining the implemented role-based policy at the content sharing system. In that case, flow proceeds to block 908. If no role-based policy element is received at decision block 906, the flow also proceeds to block 908.

At 908, the navigation module of the content sharing system may initiate access to permitted files and applications on one or more remotely connected information handling systems for navigation and review. Access at block 908 may be via a RDP or other virtualization protocol for example. Additionally, the content sharing system will determine whether the OS on the remotely connected information handling system matches or is compatible with that of the content sharing system host. As needed, the content sharing system will utilize its OS conversion protocols to enable communication with or access to applications and files on the remotely connected information handling system as described. With this access initiated, the content sharing system may proceed to block 910.

At block 910, the content sharing system may determine the remote computing device role classification. Remotely connecting computing devices may be classified by role. For example, a computing device that is personal, one that is dedicated for work or owned by an enterprise or one that is dedicated for hobbies or other activities are examples of role classifications in some embodiments.

Additionally, role classification may include determining category classifications for individual files and content on remotely connected computing devices. For example, personal files and data may be found on work computing devices or personal files and information may be found on work computing devices. Above embodiments also refer to this role classification of files in terms of relatedness to usage categories. Role classification of remotely connected computing devices as well as individual files and data may include additional categories besides work and home. Role classification may include computing device or file relatedness to kids, hobbies, volunteer activities, etc. As described, role classification of files may include a greater selection of classifications than computing device role classifications in some embodiments as well. Roles may be granulated into purposes of files and content including things relating to specific projects and the like. Determination of role classification of files and data from a remotely connected information handling system is handled as described in multiple embodiments herein.

Proceeding to block 912 in the present embodiment, the content sharing system may assess source computing device, file types, metadata, file security designations, timestamps, geotags, database history for a computing device, content of the files and data for terms, phrases, images, and the like. This, as well as other data, may be used in assessing role classification for the remotely connected computing device or devices. The classification of files and data on a remotely connected information handling systems will also be used later for when a role-based policy is applied. Subsets of files according to classifications determined accordingly on the remotely connected information handling system may be subject to role-based policy limitations.

Proceeding to block 915, the content sharing system determines a role-based policy regarding content sharing via the content sharing system. Application of the role-based policy may limit transfers between remotely connected information handling systems with different classifications, may limit transfers or aggregation by the content sharing system, and may limit navigation or viewing of some files. Role-based policy limitations on content sharing via the content sharing system may be applied as to activity between connected computing devices with differing role classifications. Role-based policy limitations may be based on file role classifications or usage-based categorizations, based on time restrictions, authorship/ownership, geotag limitations, and the like. Role-based policy limitations may specify limitations on operations of the content sharing system (transfers, aggregation, execution, commands, etc.), and on viewing and navigation of content on remotely connected computing devices or via the content sharing system.

Several examples are shown in the present embodiment of FIG. 9 of application of the role-based policy limits on the content sharing system. Proceeding to block 920, fundamental activity may be limited. For example, the role-based policy may limit viewing or navigation of a subset of files based on role or usage type of the file or based on file confidentiality levels. The role-based policy limitation may apply to files or content from remotely connected computing devices of a first role classification (type A). Next the content sharing system will determine which subset of files from the type A remotely connected computing device fall within the file role/usage classification or confidentiality level at block 922. For example, spreadsheet files for a work project and designated with a highly confidential level may be limited as to review or navigation by the content sharing system if they reside on computing devices with a role classification that is type A. For example, type A may be "work" classified information handling systems. At block 924, those files matching the restricted files according to the role-based policy will be prohibited from navigation within the content sharing system. In an example embodiment, the restricted files, such as the spreadsheet files, may be grayed out or hatched out in computing device environment-representative windows or elsewhere on the content sharing desktop. In another example, the restricted files of the example may not even appear in the content sharing desktop. In yet another example embodiment, the role-based policy may limit access and navigation from non-type A remotely connected computing devices, but permit access and navigation from other type A computing devices via the content sharing system.

Proceeding to block 930, another aspect of the determined role-based policy is applied. In this aspect, transfer of a subset of files is prohibited from remotely connected computing device with role classification type A. In one example embodiment, the same confidential project spreadsheets may also be prohibited from any transfer action including prohibition from aggregation by the content sharing system as described in embodiments above. In another example embodiment, a different subset of files may be limited from transfer where these files may be viewable and navigable via the content sharing system. For example, presentation files, such as power point files on a work related information handling system may be deemed a security risk to permit transfers via a content sharing system, but may be reviewable via the content sharing system under role-based policy aspect 930. At 932, as before, the content sharing system determines which files from the type A remotely connected information handling system or systems are subject to the role-based policy aspect at 930. At 934, transfer of files and content from type A remotely connected content sharing system or systems is prevented. In an example embodiment, the transfer-restricted files may be hatched out or grayed out. In other embodiments, the transfer restricted files may be highlighted with a color indicating they are available for review and navigation, but not transfer or aggregation via the content sharing system desktop. In the example embodiment described, a user of the content sharing system desktop may be able to view presentation files and content on computing device environment-representative windows corresponding to "work" remotely connected computing devices or navigate the files on the content sharing system desktop. However, copying or transfer of those files to the content sharing system shared memory or to another remotely connected computing device via the content sharing system would not be possible. In another embodiment, the role-based policy aspect of block 930 may only limit transfer restricted files from type A remotely connected computing devices for transfers to a non-type A remotely connected computing device. In yet another embodiment, transfer restriction may apply only to prohibit transfer to one or more recipient remotely connected computing device having specific, prohibited role classifications.

Proceeding to block 940, yet another aspect of the determined role-based policy is applied. In this aspect, transfer of a subset of files is prohibited from remotely connected computing device with role classification type B. It is understood, any number of role-classified types of connected information handling systems is contemplated for application of role-based policy aspects. For simplicity, just a few are illustrated in the present embodiments. In an example embodiment of role-based policy aspect at block 940, personal images (for example those containing a user's children) may be prohibited from any transfer action from a "home" classified computing device, including prohibition from aggregation by the content sharing system as described in embodiments above. In other example embodiments, those same personal image files may be viewable and navigable via the content sharing system desktop. For example, personal image files, may be deemed a security risk to permit transfers via a content sharing system, but may be reviewable via the content sharing system under role-based policy aspect 940. Access, manipulation, and even modification may be permitted from the content sharing system desktop, but transfer prohibited. At 942, as before, the content sharing system determines which files from the type B remotely connected information handling system or systems are subject to the role-based policy aspect at 940. In an example embodiment, face or image recognition may be used to determine which personal image files fall under the role-based policy aspect at block 940. At 944, transfer of files and content from type B remotely connected content sharing system or systems is prevented. In some embodiments, the transfer-restricted files may be grayed out or highlighted with a color indicating they are available for review and navigation, but not transfer or aggregation via the content sharing system desktop. In the example embodiment described, a user of the content sharing system desktop may be able to view presentation files and content in device environment-representative windows corresponding to "home" classified remotely connected computing devices. However, copying or transfer of those files to the content sharing system shared memory or to another remotely connected computing device via the content sharing system would not be possible. In another embodiment, the role-based policy aspect of block 940 may only limit transfer restricted files from type B remotely connected computing devices for transfers to a non-type B remotely connected computing device. In yet another embodiment, transfer restriction may apply only to prohibit transfer from a type B computing device to one or more recipient remotely connected computing device having differing specific role classifications.

Proceeding to block 950, the content sharing system may apply visual cues to a plurality of environment-representative windows indicating the role classification for the corresponding remotely connected information handling system. In example embodiments, colors used to border the environment-representative windows or as a background may be associated with role classifications: for example one color for home computing devices, one for work computing devices, and another color for computing devices that fall into neither category. As is contemplated, a plurality of role classifications are possible for remotely connected computing devices paired to the content sharing systems. For example, role classifications may include home computing devices, computing devices relating to volunteer work, computing devices that may operate frequently outside a firewall, computing devices associated with other users such as collaborative users, and so forth. It is understood that other visual cues may be utilized as well including shading, hatching, or shapes or patterns associated with an environment representative window to indicate a role classification.

In the content sharing system desktop, navigation of files via a file tree may highlight files associated with remotely connected computing devices with varying role classifications as well. For example, a shading color for an environment-representative window may also be used to highlight a file from a computing device having a similar role classification in a file hierarchy on the content sharing system desktop. An example would include when the content sharing system aggregates files from a plurality of remotely connected computing devices with different role classifications. The aggregated files may be designated by visual indicators such as colors in the aggregated file navigation system to indicate their computing devices according to role classifications.

Proceeding to block 952, and described earlier, additional visual cues may be applied to the content sharing system desktop, including computing device environment windows, to indicate that files are subject to restrictions as described above. This may include graying-out files, hatching out files, or highlighting them in another way to indicate a role-based policy restrictions such as those described herein.

Flow may also proceed to decision block 954. The content sharing system may modify the role-based policy. This may occur due to a new computing device pairing to the content sharing system. Alternatively, a user may seek to make modifications via policy setting control interface to set policy for remotely connecting information handling systems with the content sharing system. If modification is not required or desired at decision block 954, the flow may end. If modification is required or desired at decision block 954, the flow proceeds to block 956.

At block 956, the content sharing system displays the policy setting control user interface in the content sharing system desktop. In the case of a new remotely connected computing device pairing with the content sharing system, no policy setting control user interface may be necessary. The remotely connecting computing device may provide role-based policy elements to the content sharing system or a role classification of the new computing device may be discerned that will generate changes. The policy control user interface may be use to modify role classifications, file categorizations, or to designate role-based policy aspects for implementation. At block 958, changes to the role-based policy settings are saved for the content sharing system session and, in some embodiments, for future sessions.

Flow proceeds to decision block 960 where the content sharing system determines whether to apply the modified role-based policy settings. In the event of a new remotely connecting computing device, the modification will be applied unless the content sharing system session is ending or another reason not to apply the modifications. If the new role-based policy setting are not to be applied now, the flow ends. Role-based policy settings may be stored for future content sharing system sessions and invoked or used as a baseline to determine role-based policy during the subsequent session. If the modifications are applied, the flow returns to block 915 to apply now modified the role-based policy. It is understood that the sequence of steps for the method blocks depicted in FIG. 9 is not limiting and may occur in any order or some blocks may not occur at all during optional embodiments of the present disclosures. Further, aspects of other disclosed embodiments may be combined in a variety of ways with the embodiment of FIG. 9.

Figure 10:
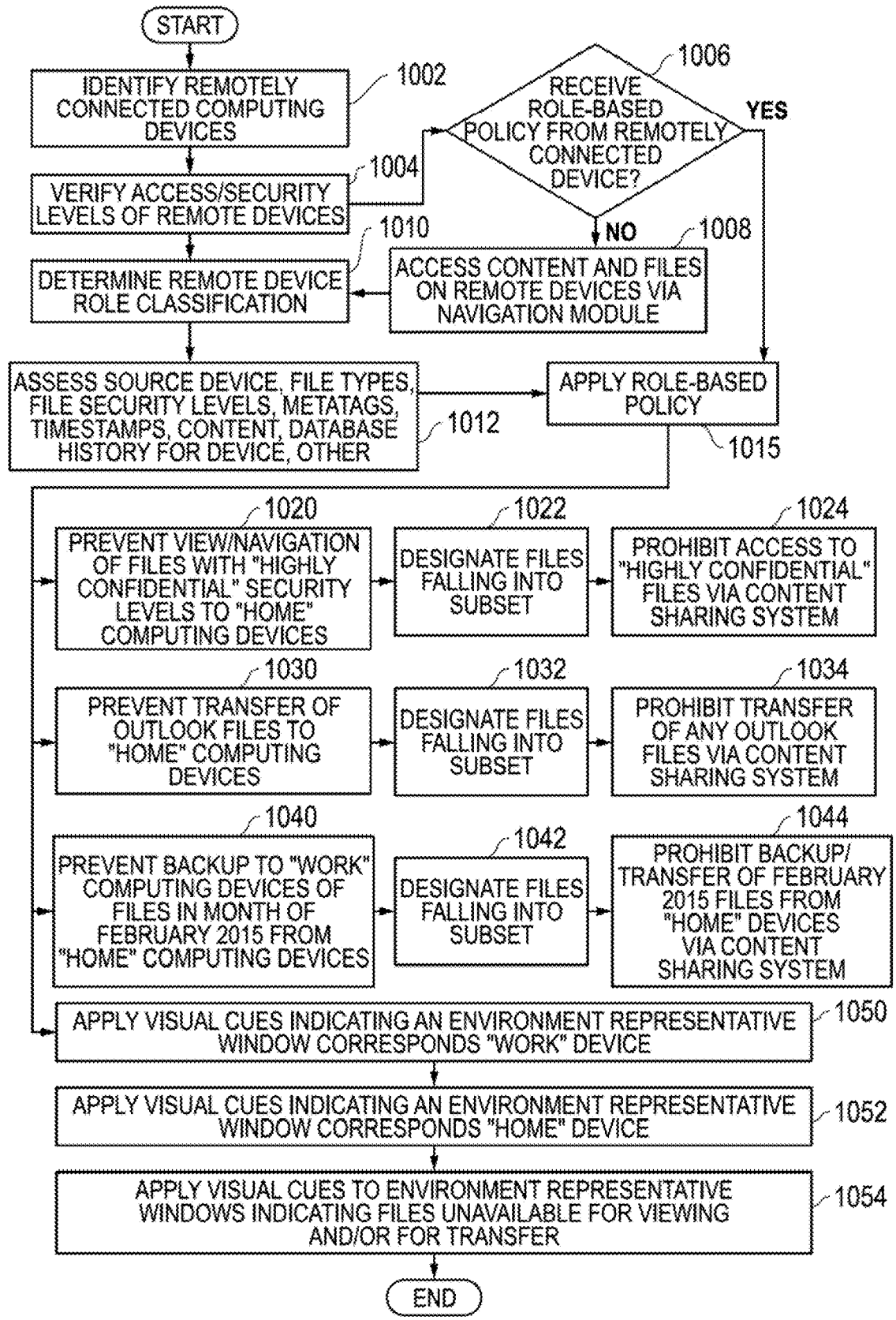
FIG. 10 is a flow diagram illustrating a method of application of role-based policy limitations for a content sharing system according to another embodiment of the present disclosure.

FIG. 10 is a flow diagram showing another example embodiment of determination and assessment of role-based policies regarding remotely connected information handling systems via operation of the content sharing system. Method 1000 begins at block 1002 where the content sharing system determines that a plurality of remotely connected computing devices are available for pairing. The content sharing system identifies remotely connected information handling systems for pairing to the content sharing system. As described previously, detection may come about via an identification of remotely connected information handling systems by unique identifiers cross referenced with an approved list of computing devices accessible by the content sharing system. In other example embodiments, application code on a remotely connected information handling system may initiate identification of the connected information handling system as accessible by the content sharing system upon pairing with the content sharing system. Other identification mechanisms are contemplated as discussed elsewhere herein or variations as is understood by those skilled in the art.

Proceeding to block 1004, the content sharing system may verify access or security levels set by an administrator of the content sharing system relating to remotely connected information handling systems. The content sharing system may cross reference pre-approved lists of unique identifiers permitted access or may work with other traditional security and access routines including encryption keys, pass codes, firewall access, and the like.

The access security levels may include security controlling access to the content sharing system by a remotely connected information handling systems in a similar fashion. Verifying access and security levels at 1004 may also include a determination of whether a remotely connecting computing device permits access to its files, and if so, whether some files and applications are restricted. In another embodiment, the content sharing system may determine security risks posed by one or more remotely connecting computing devices to the content sharing system. Additionally in some embodiments, the content sharing system is contemplated as commencing auto-pairing and auto-initiating of access via the content sharing system desktop as described previously. In an example embodiment, the detection and access routine may be auto-initiated upon an information handling system being paired with or connected to one or more WPANs, WLANs, or other networks being monitored by the content sharing system. In another example embodiment, the access to a remotely connected computing device may be via an auto-initiation upon connection to one or more WPANs, WLANs or other networks having a content sharing system associated with them.

For example, an auto-pairing command may provide for access connection, pass codes, encryption codes and keys, and other pairing data to enable an automatic wireless connection between a remotely connected information handling system and a content sharing system. These may have been pre-loaded on remotely connecting information handling systems before auto-pairing and access initiation to the content sharing system is attempted. Auto-pairing may be distributed via control plane communications or via regular data networks. Auto-pairing commands may be associated with the content sharing system and related to determining a content sharing system as part of a wireless network. A remotely connected computing device connecting to a WPAN such as Bluetooth, a WLAN connection, or other wireless connections may be subject to the auto-pairing with the information handling system hosting the content sharing system or the remote processing center that may host such a system.

Proceeding to decision block 1006, the content sharing system determines whether a role-based policy is received from a remotely connected information handling system. If the role-based policy element sourced to the content sharing system from the remotely connected information handling system is the governing role-based policy for the content sharing system, the flow proceeds to block 1014 to apply the role-based policy in some embodiments. In other embodiments, no role-based policy element may be received from the remotely connected information handling system. In an example, the role-based policy system may be a user driven policy instead which is established via the content sharing system. For example, a content sharing system desktop may have set commands or user interface access to a policy setting control interface in example embodiments to allow a user to set role-based policy. In that case flow proceeds to block 1008. Also, in yet other embodiments, a role-based policy regarding the content sharing system may be synthesized from a combination of policy elements received from remotely connected information handling systems, from user-driven policy input at the content sharing system, and from data partially discerned from assessment of the remotely connected information handling systems or data and files thereon. In that case, flow also proceeds to block 1008 for additional determination of role-based policy. Assessment of the remotely connected information handling system and files and data thereon is also relevant in application of the role-based policy implemented at the content sharing system and described in later steps.

At block 1008, the navigation module of the content sharing system may initiate access to permitted files and applications on one or more remotely connected information handling systems for navigation and review. Access may be via a RDP or other virtualization protocol as described above. Additionally, the content sharing system will determine whether the OS on the remotely connected information handling system matches or is compatible with that of the content sharing system host and apply an OS conversion protocol as needed. With this access initiated, the content sharing system may proceed to block 1010.

At block 1010, the content sharing system may determine the remote computing device role classification. Remotely connecting computing devices may have role classifications determined. For example a computing device that is personal, one that is dedicated for work or owned by a corporate enterprise, or one that is dedicated for hobbies or other activities are example of role classifications. Computing device role classification may be associated with the unique identifiers of the computing device or discerned from files and content on the computing device. Additionally, role classification may include determining category classifications for individual files and content on remotely connected computing devices as explained above. Above embodiments also refer to file classification according to roles as relatedness to usage categories, or usage classifications. These file role classifications may include categories associated with such classifications as work, home, kids, hobbies, volunteer activities, etc. In an example embodiment, it is understood that individual files may have classifications different than the remotely connected information handling system that sourced them. For example, personal files and data may be found on work computing devices or personal files and information may be found work computing devices. A determination of role classification of a remotely connected computing device is still possible based on the qualitative majority of file usage types found on the remotely connected information handling system for example. Other data received by the content sharing system will also be factored into role classification for a computing device. As described above, more role categories may be established for files and content than are used as role classifications for the remotely connected computing devices. Roles categories for files may be granulated into multiple purposes of files or content. Files and content may be designated into a plurality of categories to provide numerous convenient options for navigation, aggregation, or other content sharing functions to be performed on the files and content from the plurality or computing devices. File categorization by usage categories may include role granularity to describe detail such as particular projects and the like for example. Determination of role classification of files and data from a remotely connected information handling system is handled as described above, for example with respect to FIG. 7.

Proceeding to block 1012 in the present embodiment, the content sharing system may make an assessment of source computing device, file types, metadata, file security designations, timestamps, geotags, database history for a computing device, content of the files and data, as well as other data in assessing role classification for the remotely connected computing device. Similarly, categorization of files and data on remotely connected information handling systems may be used later for when a role-based policy is applied to subsets of files.

Proceeding to block 1015, the content sharing system determines a role-based policy for application to a session of the content sharing system. This role-based policy may also be stored for future sessions of the content sharing system. It may serve as a baseline that is subject to later modification. Application of the role-based policy may limit data or file transfers, may limit navigation or viewing of some files, or may limit execution of commands or communications via the content sharing system. Limitations under role-based policy may be directed to restrict specific computing devices falling within certain role classifications. Role-based policy limitations may also apply to limit or shield particular categories of files or content. File or data limitations may be according to usage based role classifications, files with certain authorship, purpose, geotag identifications, or timestamps and may be excluded from any or all particular content sharing system operations.

Several examples are shown of role-based policy aspects in the present embodiment of FIG. 10. Proceeding to block 1020, fundamental activity such as review and navigation may be limited as between differing role-classified remotely connected information handling systems. For example, the role-based policy may limit viewing or navigation of files having a highly confidential security level on "work" computing devices from remotely connected "home" computing devices via the content sharing system. In another embodiment, viewing and navigation may be restricted on the content sharing system desktop if any "home" remotely connected information handling systems are paired with the content sharing system. As is understood, other variations of a role-based policy control similar to this one are contemplated as well.

Next the content sharing system will determine which subset of files from the "work" remotely connected computing device fall within the file role/usage classification of a "highly confidential" security level at block 1022. This may be discerned from metadata, review of content of files or data for security designations, or requirements of secured access such as encryption or password access to the files, or other file role categorization as described above. At block 1024, those files matching the restricted files under the role-based policy will be prohibited from navigation or review from "home" computing devices. In alternative embodiments, the role-based policy may prohibit navigation or review within the content sharing system having any "home" computing devices paired to it. In an example embodiment, the restricted files may be hatched out or grayed out in computing device environment-representative windows or elsewhere on the content sharing desktop. In another example, the restricted files of the example may not even appear in the content sharing system desktop or when the content sharing system is viewed remotely via a "home" computing device.

Proceeding to block 1030, another aspect of the role-based policy is applied. In this aspect, transfer of email files is prohibited from "work" computing devices to any "home" classified computing devices via the content sharing system. In one example embodiment, email files from a "work" computing device may also be prohibited from any transfer action, including prohibition from aggregation, by the content sharing system as described in embodiments above. This may be done to prevent co-sharing of restricted files with other files from non-work classified computing devices. In the example embodiment, the email files of a "work" computing device may be navigable or viewable via the content sharing system desktop, such as via device environment-representative windows corresponding to "work" computing devices, but transfers prohibited. Additionally, email files from a "work" computing device may be navigable or reviewable via a paired "home" computing device, but transfers such as copying or aggregation again prohibited.

At 1032, as before, the content sharing system determines which files are classified as email files from the "work" classified remotely connected information handling system or systems. At 1034, transfer of email files and content from "work" remotely connected information handling system or systems is prevented to "home" classified computing devices via the content sharing system. In an example embodiment, the transfer-restricted files may be hatched out, grayed out, or highlighted with a color indicating they are available for review and navigation in some embodiments. In other embodiments, the visual cues may also indicate that transfer to approved role-classified computing devices, such as other "work" computing devices, is permitted under role-based policy. However, the restricted email files are not available for transfer or aggregation via the content sharing system desktop to be available to "home" classified computing devices in example embodiments of the role-based policy of block 1030.

Proceeding to block 1040, yet another aspect of the determined role-based policy is applied. In this aspect, a specific transfer operation is prohibited from "home" classified computing devices remotely connected to the content sharing system. In the present embodiment, back-up copying of files may be set as prohibited from "home" classified computing devices to "work" classified computing devices for files having a date stamp falling in the month of February 2015. It is appreciated that any time or date ranges may be applied. It is further appreciated that any variety of limitations may be placed on data or file types and may further be specifically directed to any variety of role-classified information handling systems during application of role-based policy. For simplicity, just a few examples are illustrated in the present embodiments.

At 1042, as before, the content sharing system determines which files fall within February 2015. Under the role-based policy, transfer from the "home" remotely connected information handling systems is prohibited to "work" remotely connected information handling system for these files. Specifically, back-up transfers of files with a timestamp during February 2015 may still occur with respect to other "home" classified computing devices or to computing devices with other role classifications. Transfer is restricted as to "work" computing devices however. Other content sharing system functions may still be permitted under this role-based policy as is understood. At 1044, back-up of files and content from "home" classified remotely connected information handling systems to "work" classified information handling systems is prevented via the content sharing system as the role-based policy is applied.

Proceeding to block 1050, the content sharing system may apply visual cues to a plurality of environment-representative windows indicating the role classification for the corresponding remotely connected information handling system. In example embodiments, colors used to border the environment-representative windows or a background may be associated with role classifications: for example one color for home computing devices, one for work computing devices, and another color for computing devices that fall into neither category. As is contemplated, a plurality of role classifications are possible for remotely connected computing devices paired to the content sharing system. For example, role classifications may include home computing devices, computing devices relating to volunteer work, computing devices that may operate frequently outside a firewall, computing devices associated with other users such as collaborative users, and so forth. It is understood that other visual cues may be utilized as well including shading, hatching, or shapes or patterns associated with an environment representative window to indicate a role classification. In the content sharing system desktop, navigation of files via a file tree or other hierarchy may highlight files according to varying role classifications of source computing devices as well. For example, a shading color for an environment-representative window may also be used to highlight a file from a computing device having a similar role classification. An example would include when the content sharing system aggregates files from a plurality of remotely connected computing devices with different role classifications, files may be designated by visual indicators such as colors in the aggregated file navigation system. That color may indicate the source computing device role classification.

Proceeding to block 1052, and described earlier, additional visual cues may be applied to the content sharing system desktop, including computing device environment-representative windows, to indicate that files are subject to restrictions as described above. This may include hatching out files, graying-out files, or highlighting them in another way to indicate a role-based policy restrictions such as those described herein.

The flow proceeds to decision block 1054 where the content sharing system desktop may display visual cues indicating that the files from "work" classified computing devices with a security level of "highly confidential" may be unavailable for review or navigation when "home" computing devices are paired. Additional visual cues may be used to indicate that email files from "work" computing devices may be unavailable for transfer to "home" computing devices. And yet other visual cues may be used to indicate that February 2015 files are unavailable for transfer or back-up from "home" computing devices to "work" computing devices. In an example embodiment, the review-restricted files may be hatched out or highlighted with a color indicating they are unavailable for review and navigation in some embodiments. In another embodiment, file representations on the content sharing system desktop may be grayed out or highlighted in a different color for the transfer-restricted files that may not be transferred or aggregated, but may be reviewed or subject to navigation via the content sharing system desktop. Colors used to frame device environment representative windows or for back ground highlighting to indicate role classification of corresponding remotely connected information handling systems paired to the content sharing system may also be used to highlight files and content to indicate the source computing device role classification in the content sharing system desktop. In other embodiments, highlighting, such as color, similar to that used for a role classification of a computing device may also be used with files and content to indicate approval or restriction for that file with respect to the corresponding role classification. A blend of visual indicators may be used to indicate role classification of source computing devices and applied role-based policy limitations.

At this point, the flow ends. However, aspects of other embodiments of the present disclosure may be used with the present embodiment. It is further understood that the sequence of steps for the method blocks depicted in FIG. 10 is not limiting and may occur in any order or some blocks may not occur at all during optional embodiments of the present disclosures. Moreover, aspects of other embodiments disclosed herein may be used with the embodiment of FIG. 10.

Figure 11:
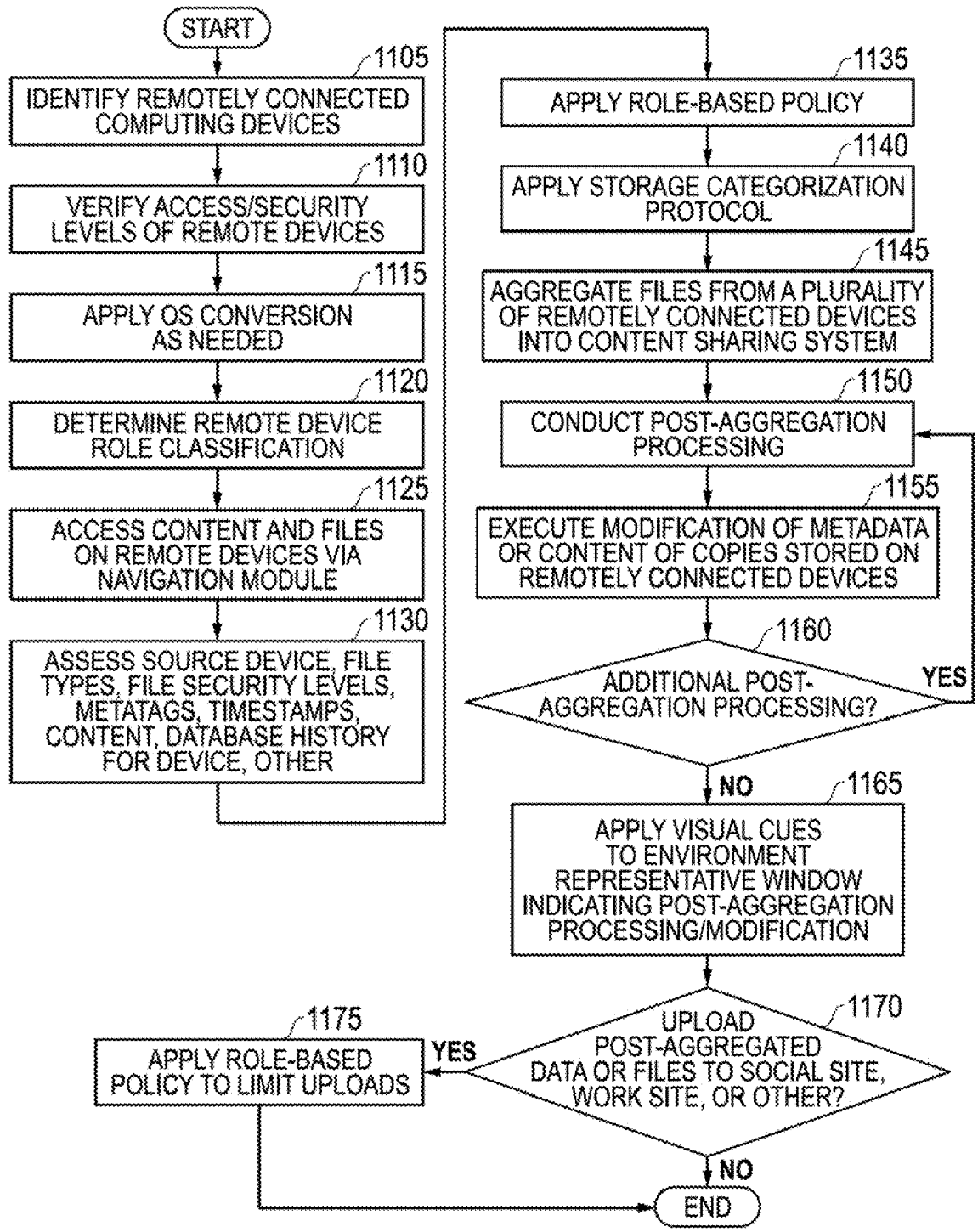
FIG. 11 is a flow diagram illustrating a method of post processing content from a plurality of remotely connected devices with a content sharing system according to an embodiment of the present disclosure.

FIG. 11 is a flow diagram showing post processing functions that may be conducted by the content sharing system on content data and files of remotely connected information handling systems according to an embodiment of the present disclosure. Method 1100 begins at block 1105 where the content sharing system determines that a plurality of remotely connected computing devices are available for pairing. The content sharing system of the present disclosure is available for more seamless navigation and manipulation of content from multiple wirelessly connected information handling systems. In an example embodiment, the content sharing system may poll a network, such as a wireless network as described further herein, to monitor the network for remotely connected or connecting information handling systems available for pairing with the wireless network and for pairing with the content sharing system. Other mechanisms for identification of remotely connected information handling systems available for pairing with the content sharing system are contemplated as discussed elsewhere herein or variations as understood by those skilled in the art.

Proceeding to block 1110, the content sharing system may verify access or security levels set by an administrator of the content sharing system relating to remotely connected information handling systems. The content sharing system may cross reference pre-approved lists of unique identifiers for remotely connected information handling systems permitted to access the content sharing system. In other embodiments, the content sharing system may use other security and access measures understood in the art including encryption keys, pass codes, firewall access, and the like before granting access to remotely connected information handling systems.

In some embodiments, as described in the disclosures herein, the content sharing system is contemplated as commencing auto-pairing and auto-initiating of access via the content sharing system desktop. Auto-pairing may include providing network connection details such as network keys, passwords, or other wireless connection data in advance of a remotely connected information handling system pairing with a network, such as a wireless network. Additionally, in another aspect, an auto-pairing may be made with the content sharing system whereby the auto-pairing command may further provide for auto-initiating access to the content sharing system. In an embodiment, content sharing system connection data may be provided including pass codes, encryption codes and keys, and other pairing data to enable an automatic wireless connection between a remotely connected information handling system and a content sharing system. The auto-pairing data, including auto-initiating data, may have been pre-loaded on remotely connecting information handling systems before auto-pairing is attempted. Auto-pairing data and auto-initiating data may be distributed via control plane communications or via regular data networks to remotely connected information handling systems before pairing in some embodiments. Auto-pairing data and auto-initiating data may be included with cookies or as part of a kernel of code residing on the remotely connecting information handling system. In an example embodiment, the detection and access routine may be auto-initiated upon an information handling system being paired with or connected to one or more WPANs, WLANs, or other network connections being monitored by the content sharing system. In another example embodiment, the access to a remotely connected computing device may be by auto-initiation upon connection to one or more WPANs, WLANs or other network having a content sharing system.

At 1115, the content sharing system may determine the OS, system architecture, and the device type of a remotely connecting information handling system. In doing so, the content sharing system determines whether the OS and other features of the remotely connecting information handling system are the same or compatible with the OS, such as a thin OS, operating the content sharing system. If not, the content sharing system will prepare to initiate OS conversion protocols as necessary for communication and file access with the remotely connected information handling system in the steps described herein.

At block 1120, the content sharing system may determine the remote computing device role classification. Remotely connecting computing devices may be classified by role as described further herein. For example, a computing device that is personal, one that is dedicated for work or owned by a corporate enterprise, or one that is dedicated for hobbies or other activities are examples of role classifications in some embodiments. Role classification may include determining category classifications for individual files and content on remotely connected computing devices that are considered in determining role classification. Those category classifications for files as described in several embodiments herein. Above embodiments also refer to this role classification of files as categorization relatedness to usage. Once role categorization is determined for a computing device, it may be stored and associated with the unique device identification(s) by the content sharing system.

At 1125, the navigation module of the content sharing system may initiate access to permitted files and applications on one or more remotely connected information handling systems for navigation and review. Access at block 1125 may be via a RDP or other virtualization protocol.

Proceeding to block 1130 in the present embodiment, the content sharing system may assess the source computing device type, file types, metadata, file security designations, timestamps, geotags, database history for the computing device, content of the stored files and the like. Content search may be employed including image recognition, term searches or similar search techniques for content to help discern usage categories of files. This, as well as other data, may be used in assessing role classification for the remotely connected computing device or devices as described above. However, this data is also pertinent to the classification of files and data on a remotely connected information handling systems into categories for application of role-based policy, aggregation categorization, and post processing functions of the content sharing system in some embodiments. Subsets of files under certain categorizations from the remotely connected information handling system may be subject to content sharing system operations including post processing activity based on the usage categorizations.

The flow proceeds to decision block 1135 where the content sharing system determines whether a role-based policy is to be applied to content sharing system operations. As with the embodiments above, the role-based policy may be received from a remotely connected information handling system, may be a user driven policy established via the content sharing system, or may be synthesized from a combination of policy elements of both and discerned from data collected about the remotely connected information handling systems or data and files thereon. The role-based policy implemented by the content sharing system may impact the operations described above, but may have separate aspects specifically limiting content sharing system post-processing activities or uploading of content data and files to external sites as described in the present embodiment. In some embodiments, the role-based policy may limit post-processing activity including prohibiting alteration of metadata for certain files aggregated by the content sharing system. In other embodiments, role-based policy may prohibit metadata alterations from being transferred or exported to the file copies on the source remotely connected information handling system. In yet other example embodiments, post-processing may be prohibited with respect to content data and files aggregated by the content sharing system. Additionally, role-based policy may limit or prohibit post processing on versions of files or file copies remaining on the source remotely connected information handling system. Additionally, role-based policy may apply limitations with respect to post processing operations on determined category subsets of files or content similarly to the role-based policy applications set forth in embodiments above.

In further embodiments, the role-based policy may limit operation of the content sharing system with respect to a source or a recipient remotely connected information handling system based on role classifications. As above, prohibitions or authorizations under role-based policy may be with respect to post processing operation on files sourced from certain role-classified remotely connected information handling systems. In other aspects, prohibitions may be with respect to limiting access by or transfer to certain role classified recipient devices even after post processing. As another aspect, role-based policy may place limitations on uploads via the content sharing system. For example, content file subsets associated with remotely connected devices or aggregated under a usage based categorization may be prohibited from upload. Additionally, role-based policy may control prohibitions on uploads directed at certain sites. For example, publically accessible sites such as Facebook®, Twitter®, Vimeo®, or the like may be barred for upload of certain content designated by the role-based policy of the content sharing system. Alternatively, upload only to approved sites, such as home back-up sites or virtual cloud storage, may be approved for specific file category subsets by the role-based policy.

The content sharing system may apply the role-based policy to several aspects of the content sharing system operation at 1135. Additionally, modification to the role-based policy may be made and applied immediately. The role-based policy modifications may be saved for future sessions of the content sharing system operation.

Proceeding to block 1140, the content sharing system applies categorization protocol to determine appropriate usage based categories for content and files from the plurality of remotely connected information handling systems. In an embodiment, this categorization protocol is useful for storage categorization during file aggregation conducted by the content sharing system according to embodiments herein. Navigation, via the navigation module, of files by role categorization or other categorization such as timeframe, geolocation, source device, file-type or other embodiment categories is available via the content sharing system desktop.

At block 1145, the content sharing system aggregates files from a plurality of remotely connected devices into the content sharing system. Additional detail of aggregation is described in embodiments herein. In one aspect, aggregation of files may be stored at a shared memory attached to a host information handling system for the content sharing system. In other aspects, storage of aggregated files may occur at shared memory located at a remote data center or a combination or local and remote memory may be used. In an aspect, aggregated data may be stored according to storage categorization protocols as described in embodiments herein. Further, aggregation may be limited or controlled by role-based policy in accordance with above embodiments as well.

Proceeding to block 1150, the content sharing system may conduct post-aggregation processing on files in shared memory of the content sharing system. In an example embodiment, post-aggregation processing may be conducted by a categorization engine, a modification engine, an execution engine or any combination. A processor executing instructions may provide for application of the categorization protocol, may execute code to conduct additional post processing activity as described, and may elect to modify metadata or content data files resulting from the post processing activity of the content sharing system. It is understood that in some embodiments, post processing of files may not require aggregation by the content sharing system. Application of categorization protocol to files stored on a plurality of remotely connected information handling systems may yield a category hierarchy of all files from the remotely connected devices. This category hierarchy is navigable by the content sharing system via the content sharing system desktop. It is understood therefore, that post processing activity may be applied direct to the files on the plurality of remotely connected devices by the content sharing system instead of via aggregated and stored files on the content sharing system shared memory in some embodiments. The present embodiment is described for files and content aggregated by the content sharing system.

In one example embodiment, the content sharing system post processing provides a search function of categorizations of content data and files from a plurality of available source computing devices from the remote content sharing system platform. The content sharing system desktop may provide viewable sub-categorizations for aggregated files and, once accessed, those sub-categorization may be searchable. For example, if an aggregated file sub-categorization is created for photos, all photo files available from source remotely connected information handling systems may be accessible via this category subject to any applied role-based policy. A search may be made of photos according to timeframe, location, or image recognition may be used to discern faces to identify people. These are a few examples of search functions that may be available in post processing embodiments. Thus searching for photos having one or more individuals from among a plurality of remotely connecting devices may now be seamless and efficient via the content sharing system. Alternatively, photo enhancement processing may be conducted on the resulting subset of photos, for example, red eye detection or exposure adjustments made. Additional categories from aggregated files are contemplated for post processing activity as well. For example, usage based categories may permit searches to be conducted on work files or for financial files according to accounts, names, dates, and the like. For example, text or grammar detection may be used with such subsets of aggregated files of a usage based category.

The flow proceeds to block 1155 where the content sharing system may execute modification of metadata or content of files aggregated by the content sharing system. Metadata or content modification will depend on the result of the post-processing conducted. For example, metadata may be altered with respect to categorization protocol being applied to indicate which categories under the content sharing system the file will fall into. Additionally, modification of content data files may be made with respect to post-processing. For example, a red-eye correction or grammar correction may be applied to files searched and discovered under the aggregated file categories. In an aspect of the disclosure, the modifications of metadata or content data files may be exported to copies stored at the remotely connected information handling systems as well. In some embodiments, role-based policy may restrict or require modifications to metadata or content be made at the content sharing system shared storage. In other embodiments, modification of metadata or content data files may be restricted or required on remotely connected information handling systems according to role-based policy.

Flow proceeds to decision block 1160, where the content sharing system determines whether additional post processing activity is required. If so, the flow returns to block 1150 to conduct additional post-aggregation processing. If not, flow proceeds to block 1165.

At block 1165, the content sharing system may apply visual cues to a plurality of environment-representative windows or elsewhere in the content sharing system desktop to indicate which files have been subject to post-aggregation processing or modifications as a result of that post processing. As above, a variety of visual cues may be available including active and passive visual cues. In an example embodiment, colors or shading may be used to highlight files that have been modified or had metadata modified. In other example embodiments, if post processing is requested by a user of the content sharing system, an active cue may be used to indicate application of the post processing. For example, a blinking of highlight or text may be used to indicate post processing has been conducted on given files or a category folder of files. In one embodiment, the active visual indicator may be temporary upon completion of the post processing activity. As is contemplated, a plurality of visual cues in the content sharing system desktop and device environment-representative windows may be utilized as well including shading, hatching, or shapes or patterns to indicate post processing.

The flow proceeds to decision block 1170 where the content sharing system may receive a command to upload aggregated files to an external site. In some embodiments, uploading of some categorized files may be transferred directly from remotely connected devices instead of from shared memory. Uploading of content data files would be subject to any implemented role-based policy. Upload commands may be received via a drag-and-drop process on the content sharing system desktop. For example, one or more files may be selected from a tree hierarchy of aggregated files or a folder of categorized files may be selected. The selected files or folder may be dragged and dropped on an icon representing an external site. Other upload commands are contemplated as well including selection of commands, shortcut keys and other way for a user to interact with the content sharing system desktop and indicate an upload is desired. In some embodiments, it is contemplated that post processing be executed automatically as preset in the content sharing system. The execution of post processing activity may be triggered the content sharing system. For example, when access to content by the navigation module of the content sharing system is granted, execution of certain processing may take place directly with files on the remotely connected information handling systems. In other embodiments, post processing may be triggered upon aggregation of files from a plurality of remotely connected computing devices. Other triggers may initiate post processing execution in various embodiments.

Examples of external sites include social media sites, back-up storage sites, cloud storage sites, or protected file sharing sites. Each may have icons on the content sharing system desktop. The external sites may be role classified as well. Role classification may be assigned to external sites and determined as to compatibility with the role classifications applied to the remotely connected information handling systems paired to the content sharing system. In an aspect, a cloud storage site may be designated for work, while a back-up storage site may be designated as a home classified external site. Social networking sites may be classified as public in other examples. Additionally, the icon on the content sharing system desktop for external sites may be expandable in some embodiments. For example, in a secured file sharing site external to the content sharing system, an icon expansion may provide options for uploading including selection of sub-locations to upload files. Examples may include selection, via the content sharing system desktop icon, to upload to active folders, most-used folders, folders with the most content, or folders for particular external site purposes such as public accessibility folders versus secured folder locations. In another example, selecting a plurality of photos for upload may be designated for upload to a social media site. Expansion of the icon may allow for selection of a specified album according to people appearing in the photos, according to timeframe, according to location, or other albums for upload of the photos. Uploading via the content sharing system avoids the need of a user to separately manage content and data files for upload across multiple computing devices and to manage navigating the external site. In addition, the content sharing system may accommodate devices with a diversity of OS types or system architectures to make the uploading activity more seamless and efficient. If an upload command is not received at decision block 1170, the flow ends. If an upload is desired, the flow proceeds to block 1175 where role-based policy is applied. Role-based policy may prohibit or require uploads via the content sharing system. For example, files may be required to be backed up to a cloud-based storage upon application of a post processing. In other aspects of role-based policy, prohibitions may be placed on uploading certain file categories, confidentiality designations, or other file types to designated external sites. For example, publically accessible sites including social media may be subject to restrictions or prohibitions from role-classified computing devices or files sourced from those computing devices. Role-based policy may also limit of uploads of files or content falling within various usage categories or other categories such as security level designations. Variations are contemplated in accordance with application of role-based policy similar to embodiments described herein. After application of role based policies, the upload to an external site may be executed and the flow may end.

It is understood that the sequence of steps for the method blocks depicted in FIG. 11 is not limiting and may occur in any order or some blocks may not occur at all during optional embodiments of the present disclosures. Further, aspects of other disclosed embodiments may be combined in a variety of ways with the embodiment of FIG. 11.

Figure 12:
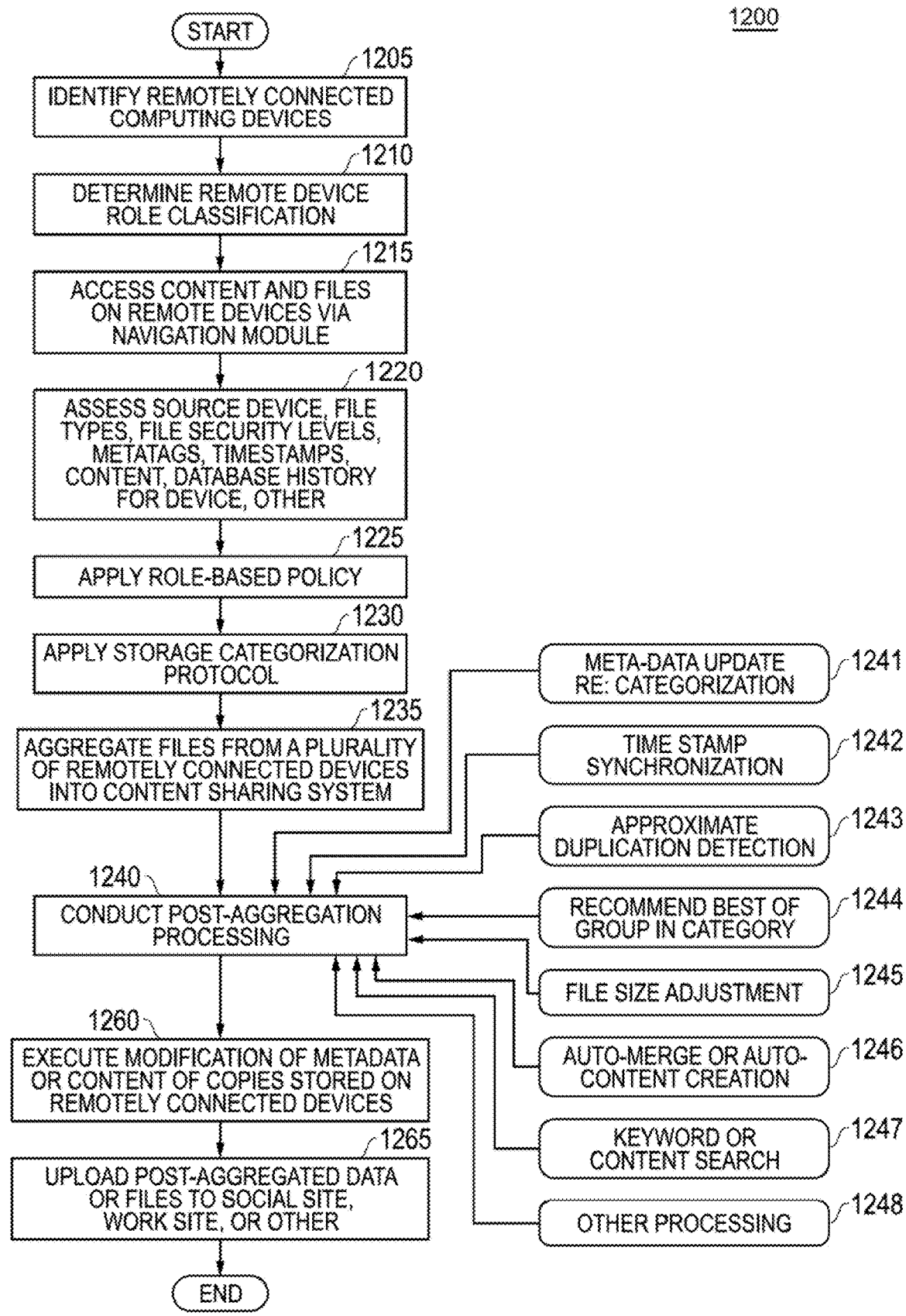
FIG. 12 is a flow diagram illustrating a method of post processing content from a plurality of remotely connected devices with a content sharing system according to another embodiment of the present disclosure.

FIG. 12 is another flow diagram showing post processing functions that may be conducted by the content sharing system on content data and files from a plurality of remotely connected information handling systems according to an embodiment of the present disclosure. Method 1200 begins at block 1205 where the content sharing system determines that a plurality of remotely connected computing devices are available for pairing. In an example embodiment, the content sharing system may poll a network, such as a wireless network as described further herein, to monitor the network for remotely connected or connecting information handling systems available for pairing. Auto-pairing may be executed with the wireless network as well as for pairing with the content sharing system. Other mechanisms for identification and pairing of remotely connected information handling systems with the content sharing system are contemplated as discussed elsewhere herein and include variations as understood by those skilled in the art.

After identification of the remotely connected information handling systems, the content sharing system may verify access or security levels set by an administrator of the content sharing system relating to remotely connected information handling systems. For example, cross referencing pre-approved lists of unique identifiers or receiving verification of compliance with other security and access measures understood in the art may be used in accordance with embodiments of the present disclosure.

At block 1210, the content sharing system may determine the remote computing device role classification. Remotely connecting computing devices may be classified by role as described further herein. For example, a computing device that is personal, one that is dedicated for work or owned by a corporate enterprise, or one that is dedicated for hobbies or other activities are examples of role classifications in some embodiments of the present disclosure. Role classification may include determining category classifications for individual files and content on remotely connected computing devices to assist with role classification. Embodiments of role classification of remotely connected computing devices are described further herein as well.

At 1215, the navigation module of the content sharing system may initiate access to permitted files and applications on one or more remotely connected information handling systems for navigation and review. Access at block 1215 may be via a RDP or other virtualization protocol for example. In some embodiments, as described in the disclosures herein, the content sharing system is contemplated as commencing auto-pairing and auto-initiating of access via the content sharing system desktop. Auto-pairing may include providing network connection details such as network keys or other password in advance of a remotely connected information handling system pairing with a network, such as a wireless network. Auto-pairing with a wireless network monitored by the content sharing system and including auto-initiation of access between the remotely connected computing device and the content sharing system may be conducted according to various embodiments such as those described herein.

Proceeding to block 1220, the content sharing system may assess source computing device, file types, metadata, file security designations, timestamps, geotags, database history for a computing device, content of the files and data for terms, phrases, images, and the like for assessing categorization of files and data on remotely connected information handling systems. The assessed data may be used for application of role-based policy, aggregation categorization, and post processing functions of the content sharing system in some embodiments.

At block 1225 the content sharing system determines whether a role-based policy is to be applied to content sharing system operations. As with the embodiments above, the role-based policy may be partly received from a remotely connected information handling system, established via the content sharing system, discerned from data collected about the remotely connected information handling systems or data and files thereon, or any combination of the same. The role-based policy, in accordance with various embodiments exemplified herein, is implemented by the content sharing system. For example, the role-based policy may impact the content sharing system operations described above including limiting or requiring post-processing activities or limiting uploading of content data and files to external sites. In some embodiments, the role-based policy may limit post-processing activity including prohibiting alteration of metadata for files aggregated by the content sharing system or prohibit alteration of metadata to be translated or exported to the file copies on the source remotely connected information handling system. Similarly in other embodiments, post-processing may be prohibited from altering content data and files aggregated by the content sharing system or prohibited with respect to versions of files or file copies remaining on the source remotely connected information handling system. As with previous embodiments, role-based policy may apply limitations or requirements with respect to operations, subsets of files or content, source or recipient connected information handling systems, or external sites utilized via the content sharing system. For example, content file subsets associated with a class of remotely connected devices or aggregated under a usage based categorization may be prohibited from modification or upload. Additionally, role-based policy may control prohibitions on uploads directed at certain sites. For example, publically available sites such as Facebook®, Twitter®, Vimeo®, or the like may be barred for upload of certain content designated by the role-based policy of the content sharing system. Alternatively, upload only to approved sites such as home back-up sites or virtual cloud storage for specific purposes may be set forth for specific file category subsets by the role-based policy.

The content sharing system may apply the role-based policy to several aspects of the content sharing system operation at 1225. As with previous embodiments, modification to the role-based policy may be made via role-based policy control interface or by virtue of addition of another remotely connected computing device. Modifications to role-based policy may be applied immediately or saved for future sessions of the content sharing system operation as with previous embodiments.

Proceeding to block 1230, the content sharing system applies categorization protocol to determine appropriate usage based categories for content and files of the plurality of remotely connected information handling systems. In an embodiment, this categorization protocol is useful for storage categorization during file aggregation conducted by the content sharing system according to embodiments herein. Navigation of files by role categorization or other categorization such as timeframe, geolocation, source device, filetype, or other embodiment categories may then occur via the content sharing system desktop.

In the present embodiment, the content sharing system aggregates files according to a storage categorization protocol at block 1235. The storage categorization protocol may include usage based categories as exemplified in embodiments herein. The content sharing system aggregates files from a plurality of remotely connected devices into shared memory attached to a host information handling system or remote storage or a combination of the same. In an aspect of embodiments herein, aggregation may be limited or controlled by role-based policy as well.

Proceeding to block 1240, the content sharing system may conduct post-aggregation processing on files in shared memory of the content sharing system. In an example embodiment, post-aggregation processing may be conducted by a categorization engine, a modification engine, an execution engine or any combination. A processor executing instructions may provide for application of the categorization protocol, may execute code to conduct additional post processing activity as described herein, and may elect to modify metadata or content data files resulting from the post processing activity of the content sharing system. It is understood that in some embodiments, post processing of files may not require aggregation by the content sharing system. In an embodiment, post processing activity may be applied direct to some or all files on the plurality of remotely connected devices instead of or in addition to those files aggregated by the content sharing system. Aggregation and utilization of shared storage is discussed in the present embodiment however.

Several example embodiments are shown in FIG. 12. At 1241, the content sharing system desktop may provide viewable sub-categorizations for aggregated files. Post processing of the aggregated files may include modifications to metadata for the aggregated files to reflect the one or more sub-categorizations applied to the files by the content sharing system. Metadata modification may be applied to the aggregated files in shared memory subject to any role-based policy. Additionally, metadata modification may also be applied to copies of the aggregated files stored on the remotely connected computing devices paired to the content sharing system.

The sub-categories of aggregated files may also be searchable. A search function may be part of post processing, where searches may be conducted from sub-categorization folders containing content data and files aggregated from a plurality of available source devices in the content sharing system. For example, if an aggregated file sub-categorization is set to videos, all video files from a plurality of source remotely connected information handling systems may be accessible and searched via this category, subject to any applied role-based policy. A search may be made of videos according to timeframe, location, or image recognition. The search may be calendar aware in that it may determine when a user may be on vacation, away from work, or likely working when the file is created. Geotags and image recognition may contribute to the searches used to find holiday videos across the plurality of remotely connected information handling systems via the content sharing system. Searching for videos may be more seamless and efficient via the content sharing system. Moreover, uploading or posting videos, such as holiday videos, from a plurality of remotely connected devices is simpler and more efficient via the content sharing system.

Alternatively, video post-processing may be applied to correct video issues determined within the content. In some embodiments, post processing activity may be cumulative in that tt may be applied in connection with previous post processing activity. For example, video enhancement may be applied to files yielded in search results that determine holiday videos as above. In one example, jitter reduction may be applied as a video enhancement post processing. Photo or video enhancement techniques known in the art may be applied automatically to aggregated files or automatically to search results for files from among the plurality remotely connected computing devices. Post processing applied via the content sharing system provides more seamless and efficient processing of files and content and may be applied to a plurality of additional categories at the same time as well.

Proceeding to another example embodiment in 1242, the content sharing system may initiate post aggregation processing or processing to files navigable from the content sharing system to establish time stamp synchronization. Content and files accessible from the plurality of remotely connected computing devices may have been created at different locations according to geotagging. The content sharing system may determine that timestamps have not been updated or synchronized to one time zone with respect to files from different remotely connected information handling systems. Post processing may initiate synchronization of timestamp metadata for files to one preferred time zone. Adjustments to time stamp metadata may be made in response to that synchronization, but may be subject to role-base policy restrictions.

At 1243 another example embodiment is shown. The content sharing system may detect duplication of files aggregated from one or more remotely connected information handling systems. Strict duplication of files is not necessary to be identified as a duplicate, but rather a high degree of correlation and overlap is determined to detect duplication. For example, a threshold may be set for a degree of correlation between files to be deemed a duplicate. The correlation of overlap in the compared files may be set at a 70% overlap of the content within. In other embodiments, the threshold of correlation between the aggregated files may be set as an amount of variance between files, for example no more than 30%. Degree of correlation may be set at any level and may involve multiple factors as is understood by those of skill in the art. For example, documents may be reviewed for text, images, and authorship to determine correlative overlap among aggregated files in a sub-category. Images or video may use image recognition including face recognition and histogram analysis to determine correlative overlap among files in a sub-category. Other analysis means to detect duplication are contemplated as well and understood by those of skill in the art.

Upon duplication detection, additional post processing by the content sharing system is possible. Duplicate files may be tagged for deletion upon selection of one or more keeper files in a set of identified duplicates. In this way, duplicates across a plurality of remotely connected devices may be eliminated reducing clutter for a user's file. In other embodiments, duplicates may be deleted from the shared memory or remotely connected devices as part of the post processing operation of the content sharing system. These content sharing system post processing operations may be subject, like any content sharing system functions, to the role-based policy limitations as described above.

Proceeding to 1244, post processing in another embodiment may make a determination of the best of a group of files. The group of files may be a sub-category of files or may be a set of identified duplicates in some embodiments. The content sharing system may include analysis of content for aggregated or accessible files to select or recommend one or more files as the best of the group of files. Analysis of the content of the files may be based on a plurality of quality of file indicators. Example quality of file indicators may include clarity, histogram analysis of lighting quality, etc., jitter, and similar image quality metrics for video or still images. For documents or other content files, quality of file indicators may include grammar, content volume or completeness, latest edit time, existence of editorial notes, or other factors to determine a best of group file or ranking of the group of files to a user of the content sharing system. In an embodiment, the one or more recommended best of the group files may be viewable in the content sharing system desktop. This enables the user to make a determination of one or more optimal content data files from among potentially many files on a plurality of remotely connected information handling systems in one seamless location. In another embodiment, the best of group recommendation may also be used in connection with the duplication detection. The content sharing system may recommend one or more files to keep or provide a list of recommended files for deletion as additional post processing activity.

At 1245, the content sharing system may conduct post processing on a file to adjust the file size in another example embodiment of post processing. File size reduction or enlargement may be part of the post processing. For example file size reduction via compression or other file reduction technique may be done in preparation for transfer of the file to another remotely connected information handling system or in preparation for uploading the file to an external site via the content sharing system. Compression and file reduction techniques known in the art may be employed. File size adjustments may be made to plurality of files from several remotely connected information handling system again more seamlessly from the content sharing system for a transfer or upload.

In yet another embodiment of post-processing by the content sharing system at 1246, aggregated files may be merged or auto-content created. In an example embodiment, images from a specified time frame or associated with an event may be merged into auto-content created files. For example, a collage of images sourced from a variety of remotely connected information handling systems may be auto-created as part of post processing by the content sharing system. In other embodiments, content files from remotely connected computing devices such as a plurality of wearable fitness systems may be merge by the content sharing system into a collective fitness data file or graphic representation. In this example, fitness data collected during one workout by multiple wearable fitness devices may be merged by the content sharing system more seamlessly and efficiently and despite a plurality of OS types or architectures. Similarly, data over a longer period of time may be merged into a single file for viewing of trends from a variety of time periods and from metrics monitored from a variety of remotely connected computing devices with differing OS formats.

At 1247, a keyword or other content search may be conducted on aggregated files, identified duplicates, or other aggregated files as described above. Searches for terms may yield results narrowing files down within sub-categorization folders or over the broader collection of aggregated files as described above. In another embodiment, image recognition may be used to identify people, structures, places, or other items within still and video images as part of a content search. Post processing, as mentioned, conducted on files from plural remotely connected computing devices or on files aggregated by the content sharing system has several benefits and permits a user simpler access and manipulation to files across those varied devices. It is contemplated that other post processing, as in 1248, may be executed on files from a plurality of remotely connected information handling systems via the content sharing system as well. Those of ordinary skill in the art understand that post processing any kind is contemplated as applied to files accessible from or aggregated by the content sharing system to provide the above recited efficiencies.

The flow proceeds to block 1260 where the content sharing system may execute modification of metadata or modification of content from aggregated files by the content storage system. Metadata or content modification will depend on the result of the post-processing conducted. For example, metadata may be altered with respect to a categorization protocol being applied to indicate which categories under the content sharing system a file will fall into. In another example embodiment, metadata may be altered to reflect time synchronization Additionally, modification of content data files may be made with respect to post-processing. For example, a red-eye correction or grammar correction may be applied to files searched and discovered under the aggregated file categories as described. In an aspect of the disclosure, the modifications of metadata or content data files may be exported to copies stored at the remotely connected information handling systems. In some embodiments, role-based policy may restrict or require modifications to metadata or content be made at the shared storage for the content sharing system. In other embodiments, restrictions or requirements of a role-based policy may apply to modification of metadata or content data files on remotely connected information handling systems.

Flow proceeds to block 1265, where the content sharing system may receive a command to upload aggregated files to an external site. Uploading will be content data files would be subject to role-based policy application in some embodiments as described. Upload commands may be received via a drag-and-drop process on the content sharing system desktop, via commands received via the content system desktop, short cut key commands, or may be triggered automatically in the content sharing system during a session as described above. As before external site icons may link to a variety of external sites including social media sites, back-up storage sites, cloud storage sites, or protected file sharing sites as well as other external sites used for uploading from the content sharing system. The external sites may have role classifications similar to the role classifications applied to the remotely connected information handling systems as described above. Role-based policy may be applied with respect to uploading to external sites based on site role classification in certain embodiments. Alternatively, explicit sites may be designated as approved or prohibited for uploading aggregated files or a certain categorization or sourced from a particular role-classified computing device. For example, a cloud storage site may be designated for work, home or another role classification and limited for uploading for categories of files or for different role classifications of the source computing device. Additionally, visual cues on the external site icons may indicate when a role-based policy limits or allows upload to an external site represented by the icon. In other embodiments, visual cues may indicate role classification for external sites. Highlighting, shading or other visual cues, active or inactive, may be used. Additionally, the icon on the content sharing system desktop for external sites may be expandable in some embodiments to allow more specific uploading to target locations from the content sharing system desktop. An inability to expand may indicate prohibition from uploading to that external site as well in some embodiments. Uploading via the content sharing system avoids the need of a user needing to separately manage content and data files for upload across multiple computing devices and to navigate the external site. Each step may be conducted via one location on the content sharing system desktop. In addition, the content sharing system may accommodate devices with a diversity of OS types or system architectures to make the uploading activity more seamless and efficient. At this point, the flow of the current embodiment ends.

It is understood that the sequence of steps for the method blocks depicted in FIG. 12 is not limiting and may occur in any order or some blocks may not occur at all during optional embodiments of the present disclosures. Further, aspects of other disclosed embodiments may be combined in a variety of ways with the embodiment of FIG. 12.

In accordance with at least one aspect, a user can coordinate a wide variety of content from a variety of computing devices that may have disparate hardware requirements, software architecture, or distinct operating systems (OS). For example, auto-initiation of access to remotely connected information handling systems to a content sharing system via a WPAN or WLAN enables immediate and more seamless navigation and operation of content and files from the variety of computing devices via a single desktop. On the content sharing system desktop, computing device environment-representative windows make available navigation of permitted content and files from the variety of corresponding computing devices in one location. In some embodiments, shared memory is available for manipulation, execution, or navigation of the files and content shared via the content sharing system described in the present disclosure. Post processing of files via the content sharing systems allows post processing to be conducted on those files from a plurality of remotely connected devices via one content sharing system. This promotes efficient management and manipulation of data of multiple user computing devices from one place, the content sharing system desktop and the tools available there.

In accordance with another aspect, a user can coordinate a wide variety of content from a variety of computing devices that may have disparate hardware requirements, software architecture, or distinct operating systems (OS) via aggregation and categorization of files from the plurality of remotely connected computing devices. For example, auto-initiation of aggregation of files and content from the remotely connected information handling systems to a content sharing system via a WPAN or WLAN enables immediate assessment of content and files from the variety of computing devices via a single desktop according to desired categories. On the content sharing system desktop, computing device environment-representative windows make available access and modification of permitted content and files from the variety of corresponding computing devices in one location and easy comparison of related content aggregated at the content sharing system. In some embodiments, shared memory is available for aggregation, manipulation, execution, or navigation of the aggregated files and content shared via the content sharing system as described in the present disclosure. In other embodiments, role-based policy may be applied to tailor and control files and data with respect to particular remotely connected information handling systems paired to the content sharing system. Role-based policy may be tailored in a variety of way to permit any combination of content sharing system functions and under a flexible variety of restrictions or requirements to customize protection of those files and content from the content sharing system and other paired computing devices.

In accordance with yet another aspect, the content sharing system communicates via one user interface content sharing system desktop with the shared content made accessible on a variety of computing devices that may have disparate hardware requirements, software architecture, or distinct operating systems (OS). Visual cues facilitate navigation, execution, manipulation, aggregation, application of role-based policy and other features made available in one location via the content sharing system of the present disclosure. These visual cues may include colors, highlighting, icons, active icons, movement of features of the device environment-representative windows, file tree hierarchies, command bars, or icons available on the content sharing system desktop.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a computing device, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "computing device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). A "device" or "computing device" may also refer to an information handling system.

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A content sharing system comprising:
    a processor executing instructions for the content sharing system having mixed operating system capabilities;
    the processor automatically detecting pre-approved wireless connectivity for pairing for at least one of a plurality of remotely connected computing devices via accessing an approved list of computing devices accessible by the content sharing system for automatic pairing and automatically initiating navigation based on the pre-approved wireless connectivity detected;
    the processor auto-initiating navigation accessibility to navigate content files from the at least one pre-approved remotely connected computing devices having paired by authorizing the pre-approved remotely connected computing device via the content sharing system for collaboration of viewing and navigation of the content files from the at least one pre-approved remotely connected computing device as shared content data via a content sharing system desktop;
    a display for displaying the content sharing system desktop comprising a plurality of device environment-representative windows representing file structures corresponding to a plurality of remotely connected computing devices and depicting a desktop environment of the plurality of remotely connected computing devices from which the navigation of the at least one pre-approved remotely connected computing device may occur;
    the processor aggregating content data from the plurality of remotely connected computing devices to a content sharing system storage device for access via the content sharing system desktop, wherein at least two remotely connected computing devices function via different operating systems;
    determining operating system compatibility of the plurality of remotely connected computing devices to the content sharing system and applying operating system conversion to content data from a remotely connected computing device with a dissimilar operating system to provide for navigation of the at least one pre-approved remotely connected computing device; and
    the processor post processing aggregated content data from the plurality of remotely connected computing devices.

2. The content sharing system of claim 1 wherein post processing aggregated content data includes updating metadata for aggregated files to reflect categorization under a usage based categorization protocol.

3. The content sharing system of claim 2 wherein post processing aggregated content data includes updating metadata for aggregated files to reflect categorization based on image detection in the aggregated content data.

4. The content sharing system of claim 1 wherein post processing aggregated content data includes synchronizing timestamp data to reflect one time zone.

5. The content sharing system of claim 1 wherein post processing aggregated content data includes detecting duplicative aggregated files having a high correlation of similarity.

6. The content sharing system of claim 5 wherein post processing aggregated content data includes selecting the best file among detected duplicative aggregated files quality of file indicators.

7. The content sharing system of claim 1 wherein post processing aggregated content data includes a content search function among aggregated files.

8. The content sharing system of claim 1 further comprising:
    the processor receiving a command to upload aggregated content data to an external site via a drag-and-drop of an aggregated file to an external site icon on the content sharing system desktop.

9. A method comprising:
    executing instructions, via a processor, for a content sharing system having mixed operating system capabilities;
    automatically detecting pre-approved wireless connectivity for pairing of at least one of a plurality of remotely connected computing devices to a system hosting the content sharing system via execution of code on the remotely connected computing device to initiate automatic identification of the remotely connected computing device as accessible by the content sharing system for automatic pairing and automatically initiating navigation based on the pre-approved wireless connectivity detected;
    automatically initiating navigation accessibility to navigate content files from the at least one pre-approved remotely connected computing devices having paired by authorizing the pre-approved remotely connected computing devices for collaboration on viewing and navigation of the content files from the at least one pre-approved remotely connected computing device as shared content data via a content sharing system desktop;

displaying, via a display device, the content sharing system desktop comprising a plurality of device environment-representative windows representing file structures corresponding to a plurality of remotely connected computing devices;

aggregating content data from the plurality of remotely connected computing devices to a content sharing system storage device for access via the content sharing system desktop, wherein at least two remotely connected computing devices function via different operating systems;

determining operating system compatibility of the plurality of remotely connected computing devices to the content sharing system and applying operating system conversion to content data from a remotely connected computing device with a dissimilar operating system; and post processing aggregated content data from the plurality of remotely connected computing devices.

10. The method of claim 9 wherein post processing aggregated content data includes updating metadata for aggregated files to reflect categorization under a usage based categorization protocol.

11. The method of claim 9 wherein post processing aggregated content data includes updating metadata for aggregated files to reflect categorization based on calendar awareness of a user applied to the aggregated content data.

12. The method of claim 9 wherein post processing aggregated content data includes detecting duplicative aggregated files having a high correlation of similarity and tagging for deletion at least one duplicative aggregated file.

13. The method of claim 9 wherein post processing aggregated content data includes selecting best files from a category of aggregated files based on quality of file indicators.

14. The method of claim 9 further comprising:

receiving a command to upload aggregated content data to an external site via the content sharing system desktop; and applying file size adjustment for uploading to the external site.

15. An information handling system comprising:

a processor executing instructions for a content sharing system having mixed operating system capabilities;

the processor automatically detecting pre-approved wireless connectivity for pairing at least one of a plurality of remotely connected computing devices via accessing an approved list of computing devices accessible by the content sharing system for automatic pairing and automatically initiating navigation based on the pre-approved wireless connectivity detected;

the processor implementing a role-based policy to partially limit content sharing system operation based on a role classification for at least one of a plurality of remotely connected computing devices;

the processor automatically initiating navigation accessibility to navigate content files from the at least one pre-approved remotely connected computing device having paired by authorizing the pre-approved remotely connected computing devices for collaboration on viewing and navigation of the content files from the at least one pre-approved remotely connected computing device as shared content data via a content sharing system desktop;

a display for displaying the content sharing system desktop comprising a plurality of device environment-representative windows representing file structures corresponding to a plurality of remotely connected computing devices;

the processor aggregating content data from the plurality of remotely connected computing devices to a content sharing system storage device for access via the content sharing system desktop, wherein at least two remotely connected computing devices function via different operating systems;

the processor determining operating system compatibility of the plurality of remotely connected computing devices to the content sharing system and applying operating system conversion to content data from a remotely connected computing device with a dissimilar operating system; and the processor post processing aggregated content data from the plurality of remotely connected computing devices.

16. The information handling system of claim 15 wherein post processing aggregated content data includes updating metadata for aggregated files to reflect categorization under a usage based categorization protocol.

17. The information handling system of claim 16 wherein post processing aggregated content data includes updating metadata for aggregated files to reflect categorization based on image detection in the aggregated content data.

18. The information handling system of claim 15 wherein post processing aggregated content data includes synchronizing timestamp data to reflect one time zone.

19. The information handling system of claim 15 wherein post processing aggregated content data includes detecting duplicative aggregated files having a high correlation of similarity.

20. The information handling system of claim 15 further comprising:

the processor applying a role-based policy to aggregated content data with respect to uploads to an external site; and the processor uploading selected aggregated files to the external site via the content sharing system when a role-based policy does not prohibit the upload.

* * * * *